(12) United States Patent
Ahn

(10) Patent No.: US 8,368,990 B2
(45) Date of Patent: Feb. 5, 2013

(54) POLARITON MODE OPTICAL SWITCH WITH COMPOSITE STRUCTURE

(75) Inventor: Doyeol Ahn, Seoul (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 441 days.

(21) Appl. No.: 12/545,678

(22) Filed: Aug. 21, 2009

(65) Prior Publication Data

US 2011/0043884 A1 Feb. 24, 2011

(51) Int. Cl.
*G02F 1/03* (2006.01)
*H01L 29/06* (2006.01)

(52) U.S. Cl. .......................................... 359/243; 257/24
(58) Field of Classification Search .................. 359/243; 257/9, 24; 438/69
See application file for complete search history.

(56) References Cited

U.S. PATENT DOCUMENTS

| | | |
|---|---|---|
| 3,990,096 A | 11/1976 | Namizaki et al. |
| 4,764,261 A | 8/1988 | Ondris et al. |
| 5,079,774 A | 1/1992 | Mendez et al. |
| 5,112,410 A | 5/1992 | Chen |
| 5,175,739 A | 12/1992 | Takeuchi et al. |
| 5,181,219 A | 1/1993 | Mori et al. |
| 5,181,221 A | 1/1993 | Mori et al. |
| 5,182,757 A | 1/1993 | Mori et al. |
| 5,287,377 A | 2/1994 | Fukuzawa et al. |
| 5,291,507 A | 3/1994 | Haase et al. |
| 5,295,148 A | 3/1994 | Mori et al. |
| 5,317,584 A | 5/1994 | Mori et al. |
| 5,404,027 A | 4/1995 | Haase et al. |
| 5,404,369 A | 4/1995 | Mori et al. |
| 5,490,953 A | 2/1996 | Morita |
| 5,606,176 A | 2/1997 | Nitta |
| 5,646,419 A | 7/1997 | McCaldin et al. |
| 5,818,072 A | 10/1998 | Schetzina |
| 5,933,444 A | 8/1999 | Molva et al. |
| 6,069,380 A | 5/2000 | Chou et al. |
| 6,515,313 B1 | 2/2003 | Ibbetson et al. |
| 6,627,914 B1 | 9/2003 | Komiyama et al. |
| 6,803,596 B2 | 10/2004 | Hata |

(Continued)

FOREIGN PATENT DOCUMENTS

| | | |
|---|---|---|
| JP | 09199783 | 7/1997 |
| JP | 07202340 | 8/2007 |

(Continued)

OTHER PUBLICATIONS

Reginald B. Little, et al "Formation of quantum-dot quantum-well heteronanostructures with large lattice mismatch: ZnS/CdS/ZnS" Journal of Chemical Physics, vol. 114, No. 4, Jan. 22, 2001; pp. 1813-1822.

(Continued)

*Primary Examiner* — James Jones
(74) *Attorney, Agent, or Firm* — Workman Nydegger

(57) ABSTRACT

Devices, methods, and techniques for frequency-dependent optical switching are provided. In one embodiment, a device includes a substrate, a first optical-field confining structure located on the substrate, a second optical-field confining structure located on the substrate, and a composite structure located between the first and second optical-field confining structures. The second optical-field confining structure may be spaced apart from the first optical-field confining structure. The composite structure may include an embedding structure with a surface to receive photons and multiple quantum structures located in the embedding structure.

26 Claims, 15 Drawing Sheets

U.S. PATENT DOCUMENTS

| | | | |
|---|---|---|---|
| 6,813,063 | B2 | 11/2004 | Ishihara |
| 6,891,329 | B2 | 5/2005 | Nagano et al. |
| 7,420,225 | B1 | 9/2008 | Wanke et al. |
| 7,638,817 | B2 | 12/2009 | Shur et al. |
| 8,227,793 | B2 | 7/2012 | Ahn |
| 2002/0031153 | A1 | 3/2002 | Niwa et al. |
| 2002/0150135 | A1 | 10/2002 | Naone et al. |
| 2004/0058467 | A1 | 3/2004 | Chirovsky et al. |
| 2004/0095978 | A1 | 5/2004 | Cheng et al. |
| 2004/0183087 | A1 | 9/2004 | Gardner |
| 2004/0232412 | A1 | 11/2004 | Burgener, II et al. |
| 2005/0074576 | A1 | 4/2005 | Chaiken et al. |
| 2005/0185686 | A1 | 8/2005 | Rupasov et al. |
| 2005/0285128 | A1 | 12/2005 | Scherer et al. |
| 2006/0244003 | A1 | 11/2006 | Ueda et al. |
| 2007/0063304 | A1 | 3/2007 | Matsumoto et al. |
| 2007/0126021 | A1 | 6/2007 | Ryu et al. |
| 2007/0126037 | A1 | 6/2007 | Ikeda |
| 2007/0194297 | A1* | 8/2007 | McCarthy et al. ............ 257/14 |
| 2007/0298551 | A1 | 12/2007 | Bouvet et al. |
| 2008/0048193 | A1 | 2/2008 | Yoo et al. |
| 2008/0197366 | A1 | 8/2008 | Yoo et al. |
| 2009/0017268 | A1 | 1/2009 | Skipor et al. |
| 2009/0020149 | A1 | 1/2009 | Woods et al. |
| 2009/0106583 | A1 | 4/2009 | Kawamura |
| 2009/0114940 | A1 | 5/2009 | Yang et al. |
| 2009/0121628 | A1 | 5/2009 | Cho et al. |
| 2009/0273820 | A1 | 11/2009 | Dionne et al. |
| 2009/0310640 | A1 | 12/2009 | Sato et al. |
| 2010/0096001 | A1 | 4/2010 | Sivananthan et al. |
| 2010/0155696 | A1 | 6/2010 | Duan et al. |
| 2010/0261338 | A1 | 10/2010 | Tsakalakos et al. |
| 2010/0276661 | A1 | 11/2010 | Ahn |
| 2010/0301308 | A1 | 12/2010 | Ahn |
| 2010/0301454 | A1 | 12/2010 | Zhang et al. |
| 2010/0326489 | A1 | 12/2010 | Ahn |
| 2011/0001121 | A1 | 1/2011 | Ahn |
| 2011/0001122 | A1 | 1/2011 | Ahn |
| 2011/0001124 | A1 | 1/2011 | Ahn |
| 2011/0001125 | A1 | 1/2011 | Ahn |
| 2011/0095309 | A1 | 4/2011 | Ahn |
| 2011/0114995 | A1 | 5/2011 | Ahn |
| 2012/0040483 | A1 | 2/2012 | Ahn |

FOREIGN PATENT DOCUMENTS

| | | |
|---|---|---|
| WO | WO 2009067347 | 5/2009 |
| WO | WO 2009106583 | 9/2009 |
| WO | WO 2010137865 | 12/2010 |
| WO | WO 2011004990 | 1/2011 |

OTHER PUBLICATIONS

V. I. Klimov, et al "Optical Gain and Stimulated Emission in Nanocrystal Quantum Dots" Science, vol. 290, No. 314, Oct. 13, 2000; pp. 314-317.

Michael J. Hartmann, et al "Strong Photon Nonlinearities and Photonic Mott Insulators" Physical Review Letters, vol. 99, No. 103601, Sep. 7, 2007; pp. 13601-1 to 103601-4.

Australian Patent Office, Written Opinion and Search Report in PCT application (PCT/KR2010/005600 filed Aug. 23, 2010) claiming priority to the present application; mailed Oct. 22, 2010.

U.S. Appl. No. 13/485,241, filed May 31, 2012, Ahn.

A. Jia, et al. "Design of a new UV/blue/green light emitters made of hexagonal-phase ZnMgCdOSSe mixed-crystal system fabricated on GaAs- and InP-(1 1 1) substrates" Journal of Crystal Growth 214/215 (2000) pp. 1085-1090.

Al-Salim, Najeh, Synthesis of CdSeS Nanocrystals in Coordinating and Noncoordinating Solvents: Solvent's Role in Evolution of the Optical and Structural Properties, Mar. 26, 2007.

Alda, Javier et al., "Optical antennas for nano-photonic applications," vol. 16, No. 5, Trends on Nanothecnology. TNT2004. Phantoms Foundations. Segovia (Spain). Sep. 13-17, 2004, http://www.iop.org/EJ/abstract/0957-4484/16/5/017.

Arup Neogi, et al. "Enhancement of spontaneous recombination rate in a quantum well by resonant surface plasmon coupling" Physical Review B, vol. 66 (2002) pp. 153305-1-153305-4.

Australian Patent Office; International Search Report and Written Opinion in corresponding PCT application (PCT/KR2010/007292); mailed Jan. 26, 2011.

B. Ullrich, Semiconductor Science and Technology "Green emission and bandgap narrowing due to two-photon excitation in thin film CdS formed by spray pyrolysis", published Jun. 22, 2011.

Chul Huh, et al., "Improvement in light-output efficiency of InGaN/GaN multiple-quantum well light-emitting diodes by current blocking layer", Appl. Phys., vol. 92, No. 5, Sep. 1, 2002, 2248-2250, American Institute of Physics.

D. Ahn, et al. "Electric field dependence of instrasubband polar-optical-phonon scattering in a quantum well" Physical Review B, vol. 37, No. 5, Feb. 15, 1988-I, pp. 2529-2535.

D. Ahn, et al. "A field-effect quantum-well laser with lateral current injection". J. Appl. Phys. 64(1). Jul. 1, 2998, 440-442, American Institue of Physics.

D. Ahn, et al. "Optical Gain and Luminescence of a ZnO-MgZnO Quantum Well" IEEE Photonics Technology Letters vol. 18, No. 2, Jan. 15, 2006 pp. 349-351.

D-M. Yeh, et al "Surface plasmon coupling effect in an InGaN/GaN single-quantum-well light-emitting diode" Appl. Phys. Lett. 91, 171103 (2007).

Doyeol Ahn, et al. "Non-Markovian Gain of Strained-Layer Wurtzite GaN Quantum-Well Lasers with Many-Body Effects" IEEE Journal of Selected Topics in Quantum Electronics, vol. 4, No. 3, May/Jun. 1998, pp. 520-526.

Doyeol Ahn, "Theory of Non-Markovian Gain in Strained-Layer Quantum-Well Lasers with Many-Body Effects" IEEE Journal of Quantum Electronics, vol. 34, No. 2, Feb. 1998, pp. 344-352.

Doyeol Ahn, "Time-convolutionless reduced-density-operator theory of an arbitrary driven system coupled to a stochastic reservoir: Quantum kinetic equations for semiconductors" Physical Review B, vol. 50, No. 12, Sep. 15, 1994-II, pp. 8310-8318.

Doyeol Ahn, "Time-convolutionless reduced-density-operator theory of an arbitrary driven system coupled to a stochastic reservoir. II. Optical gain and line-shape function of a driven semiconductor" Physical Review B vol. 51, No. 4, Jan. 15, 1995-II, pp. 2159-2166.

E. H. Sargent, et al "Lateral Injection Lasers" International Journal of High Speed Electronics and Systems, Dec. 1998, vol. 9, No. 4, pp. 941-978.

Hetterich J., et al, Optimized Design of Plasmonic MSM Photodetector, IEEE Journal of Quantum Electronics Oct. 2007, vol. 43, No. 10, pp. 855 to 859.

Hoang, T. et al., "A high efficiency lateral light emitting device on SOI," Electron Devices for Microwave and Optoelectronic Applications, EDMO 2004, 12th International Symposium, Nov. 8-9, 2004, pp. 87-91.

Hyunsoo Kim, et al., "Lateral current transport path, a model for GaN-based light-emitting diodes; application to practical device designs", Appl. Phys. Lett., vol. 81, No. 7, Aug. 12, 2002, 1326-1328, American Institute of Physics.

I.V. Bradley et al. "Space-charge effects in type-II strained layer superlattices" Journal of Crystal Growth 184/185 (1998) pp. 728-731.

J. Ueno, et al. "MBE growth of AnSe/MgCdS and ZnCdS/MgCdS superlattices for UV-A sensors" Phys. Stat. Sol. (c) 3, No. 4, pp. 1225-1228 (2006).

Jie Liu, et al. "AIGaN/GaN/InGaN/GaN DH-HEMTs With an InGaN Notch for Enhanced Carrier Confinement" IEEE Electron Device Letters, vol. 27, No. 1, Jan. 2006, pp. 10-12.

Leosson, K., et al. "Long-range surface plasmon polariton nanowire waveguides for device applications" Optics Express, vol. 14, No. 1, Jan. 9, 2006 pp. 314-319.

Koichi Okamoto, et al. "Surface-plasmon-enhanced light emitters based on InGaN quantum wells" Nature Materials, vol. 3, Sep. 2004, pp. 601-605.

LEDs Magazine, "Goldeneye sets brightness benchmark for green LEDs", http://www.ledsmagazine.com/news/5/5/18, May 15, 2008, 2 pages.

Liu Liu, et al. "Novel surface plasmon waveguide for high integration" Optics Express, vol. 13, No. 17, Aug. 22, 2005 pp. 6645-6650.

P.I. Kuznetsov, et al. "Hexagonal ZnCdS epilayers and CdSSe/ZnCdS SQ structures on CdS(0001) and ZnCdS (0001) substrates grown by MOVPE" Physica E, vol. 17 (2003) pp. 516-517.

P. Waltereit, et al., Nitride semiconductors free of electrostatic fields for efficient white light-emitting diodes, Nature, vol. 406, Aug. 24, 2000, 865-868, Macmillan Magazines Ltd.

R. Paschotta "Encyclopedia of Laser Physics and Technology, vol. 1", Wiley-VCH, 2008, ISBN 3527408282, 9783527408283 p. 595.

S. Bai, et al. "Determination of the electric field in 4H/3C/4H-SiC quantum wells due to spontaneous polarization in the 4H SiC matrix" Appl. Phys. Lett. 83, 3171 (2003).

Seong-Ran Jeon, et al., "GaN tunnel junctions as a current aperture in a blue surface-emitting light-emitting diode", Appl. Phys. Lett., vol. 80, No. 11, Mar. 18, 2002, 1933-1935, American Institute of Physics.

Seong-Ran Jeon, et al., "Lateral current spreading in GaN-based light-emitting diodes utilizing tunnel contact junctions", Appl. Phys. Lett., vol. 78, No. 21, May 21, 2001, 3265-3267, American Institute of Physics.

Seoung-Hwan Park, "Crystal Orientation Effects in Electronic Properties of Wurtzite GaN/AlGaN Quantum Wells with Spontaneous and Piezoelectric Polaritzation", Jpn. J. Appl. Phys. vol. 39, Part 1, No. 6A, Jun. 2000, 3478-3482, The Japan Society of Applied Physics.

Seoung-Hwan Park, et al., "Crystal-orientation effects on the piezoelectric field and electronic properties of strained wurtzite semiconductors", vol. 59, No. 7, Feb. 15, 1999, 4725-4737, The American Physical Society.

Seoung-Hwan Park, et al. "Many-body optical gain and intraband relaxation time of wurtzite InGaN/GaN quantum-well lasers and comparison with experiment" Applied Physics Letters 87, 044103 (2005).

Seoung-Hwan Park, et al. "Many-body optical gain of wurtzite GaN-based quantum-well lasers and comparison with experiment" Appl. Phys. Lett. 72 (3), Jan. 19, 1998, pp. 287-289.

Seoung-Hwan Park, et al. "Optical gain in InGaN/InGaAlN quantum well stuctures with zero internal field" Applied Physics Letters, vol. 92, 171115 (2008) pp. 171115-1-171115-3.

Seoung-Hwan Park, et al. "Piezoelectric effects on electrical and optical properties of wurtzite GaN/AlGaN quantum well lasers" Applied Physics Letters vol. 72, No. 24, Jun. 15, 1998, pp. 3103-3105.

Seoung-Hwan Park, et al. "Spontaneous and piezoelectric polarization effects in wurtzite ZnO/MgZnO quantum well lasers" Applied Physics Letters, vol. 87, 253509 (2005) pp. 253509-1-253509-3.

Sergey I. Bozhevolnyi, et al. "Channel Plasmon-Polariton Guiding by Subwavelength Metal Grooves" Physical Review Letters, vol. 95, 046802, Jul. 22, 2005, pp. 046802-1-046802-4.

Siliconfareast.com; "Lattice Constants"; http://www.siliconfareast.com/lattice_constants.htm; 2 pages; retrieved Oct. 7, 2011.

Smith S.J. et al., "Lateral light emitting n-i-p. diodes in InSb/Al$x$In$1$-$x$Sb quantum wells," Applied Physics Letters, vol. 89, p. 111118 (2006), 3 pages.

Sumith, B. et al., Quantum Well Infrared Photodetectors for Long Wavelength Infrared Applications Proceedings of SPIE, Oct. 1998, vol. 3436, Infrared Technology and Applications XXIV, pp. 280 to 284.

Taguchi, T., et al., Ultraviolet Laser and Photodetector of CdZnS/ZnS Multiple Quantum Wells, Physica B. 1993, vol. 191, pp. 136 to 139.

Tsung-Hsing Yu, et al. "Theoretical study of the two-dimensional electron mobility in strained III-nitride heterostructures" Journal of Applied Physics, vol. 89, No. 7, Apr. 1, 2001, pp. 3827-3834.

Wikipedia; "Wurtzite crystal structure", http://en.wikipedia.org/wiki/Wurtzite_crystal_structure; 1 page; retrieved Oct. 7, 2011.

Yifei Zhang, et al. "Charge control and mobility studies for an AiGan/GaN high electron mobility transistor" Journal of Applied Physics, vol. 85, No. 1, Jan. 1, 1999, pp. 587-594.

Yu, E.T., et al., Plasmonic Nanoparticle Scattering for Enhanced Performance of Photocoltaic and Photodetector Devices, Proceeding of SPIE, Aug. 28, 2008, vol. 7033, Plasmonics: Nanoimaging, Nanofabrication and their Application IV, pp. 70331V-1 to 70331V-9.

"II-VI solar cells moving to the production phase," Photovoltaics Bulletin., (2003), vol. 2003, No. 11, Oct. 2003, pp. 10-12.

Andreani, Lucio Claudio, et al, Exchange interaction and polariton effects in quantum-well excitons, Physical Review B, vol. 41, No. 11, pp. 7536-7544 (1990).

Angelakis, D. G., et al., "Photon-blockade-induced Mott transitions and XY spin models in coupled cavity arrays," Phys. Rev. A76, 031805 (2007).

Chu, T.L., and Chu, S.S., "Thin film II-VI photovoltaics," vol. 38, Issue 3, Mar. 1995, pp. 533-549.

Compaan, A. D., et al., "Sputtered II-VI Alloys and Structures for Tandem PV," Subcontract Report NREL/SR-520-43954, Sep. 2008, pp. 64.

Gogolin, O., et al., Temperature dependence of exciton peak energies in Cui quantum dots, Solid State Communications, vol. 122, pp. 511-513 (2002).

Goosen, K.W., "Excitonic electroabsorption in extremely shallow quantum wells," Appl. Phys. Lett., vol. 57, Issue 24, pp. 2582-2584, accepted for publication Oct. 1, 1990.

Greentree, A.D., et al., "Quantum phase transitions of light," Nature Physics 2, pp. 856-861 (2006).

Kawazoe, T., and Masumoto, Y., "Luminescence Hole Burning and Quantum Size Effects of Charged Excitons in CuCl Quantum Dots," Physical Review Letters, vol. 77, Issue 24, pp. 4942-4945 (1996).

Masumoto, Y., et al., "Observation of persistent spectral hole burning in CuBr quantum dots," Physical Review B, vol. 52, No. 7, pp. 4688-4691 (1995).

Obloh, H., "Group III-nitride based blue emitters," Advances in Solid State Physics, vol. 38, 15-28 (1999).

Park, S.-H., et al., "Internal field engineering in CdZnO/MgZnO quantum well structures," Applied Physics Letters, vol. 94, Issue:8, pp: 083507, 1-3 (2009).

Ricker, T., "Samsung's "world's smallest" 8.4 megapixel CMOS sensor: so long CCD?," accessed at http://www.engadget.com/2007/03/27/samsungs-worlds-smallest-8-4-megapixel-cmos-sensor-so-long/, Mar. 27, 2007, pp. 4.

Tassone, F., et al, "Quantum-well reflectivity and exciton-polariton dispersion," Physical Review B, vol. 45, No. 11, pp. 6023-6030 (1992).

Valenta, J., et al., "Hole-filling of persistent spectral holes in the excitonic absorption band of CuBr quantum dots," Applied Physics Letters, vol. 70, No. 6, pp. 680-682 (1997).

Williams, R.S., et al., "Growth and luminescence spectroscopy of a CuCl quantum well structure," Journal of Vacuum Science and Technology A: Vaccum, Surfaces and Films, vol. 6, No. 3, pp. 1950-1952 (1988).

Hernández, F. E. et al., "High Performance Optical Limiter," accessed at http://web.archive.org/web/20050429144449/http://www.ieee.org/organizations/pubs/newsletters/leos/dec00/high.htm, accessed on May 7, 2012, pp. 5.

Shakya, J., et al., "Switching characteristics of III-Nitride blue/green micro-LEDs," The Smithsonian/NASA Astrophysics Data System, American Physical Society, Annual March Meeting, Mar. 12-16, 2001.

S. X. Jin, et al., "Size dependence of III-nitride microdisk light-emitting diode characteristics," Applied Physics Letters, May 28, 2001, vol. 78, No. 22, pp. 3532-3534.

International Search Report and Written Opinion, mailed Aug. 10, 2010, as issued in connection with Patent Application No. PCT/KR2011/003322, filed on May 26, 2010.

International Search Report and Written Opinion, mailed Sep. 10, 2010, as issued in connection with Patent Application No. PCT/KR2010/004350, filed on Jul. 5, 2010.

International Search Report and Written Opinion for International Application No. PCT/KR2010/002649 mailed on Jul. 26, 2010.

International Search Report and Written Opinion for International Application No. PCT/KR2010/008118 mailed on Feb. 11, 2011.

U.S. Appl. No. 12/472,168, mailed Jun. 18, 2010, Office Action.

U.S. Appl. No. 12/472,168, mailed Jul. 21, 2010, Office Action.

U.S. Appl. No. 12/472,168, mailed Jan. 5, 2011, Office Action.

U.S. Appl. No. 12/472,168, mailed Feb. 22, 2011, Notice of Allowance.

U.S. Appl. No. 12/472,168, mailed Aug. 18, 2011, Notice of Allowance.

U.S. Appl. No. 12/472,168, mailed Sep. 1, 2011, Notice of Allowance.
U.S. Appl. No. 12/472,168, mailed Mar. 29, 2012, Notice of Allowance.
U.S. Appl. No. 12/472,168, mailed May 29, 2012, Notice of Allowance.
U.S. Appl. No. 12/493,800, mailed Jan. 20, 2012, Office Action.
U.S. Appl. No. 12/493,800, mailed Apr. 26, 2012, Office Action.
U.S. Appl. No. 12/498,265, mailed May 17, 2011, Office Action.
U.S. Appl. No. 12/498,265, mailed Aug. 26, 2011, Office Action.
U.S. Appl. No. 12/498,265, mailed Feb. 28, 2012, Office Action.
U.S. Appl. No. 12/498,265, mailed Aug. 17, 2012, Office Action.
U.S. Appl. No. 12/498,228, mailed Sep. 1, 2010, Office Action.
U.S. Appl. No. 12/498,228, mailed Dec. 23, 2010, Office Action.
U.S. Appl. No. 12/498,228, mailed Jul. 12, 2011, Office Action.
U.S. Appl. No. 12/498,228, mailed Dec. 15, 2011, Notice of Allowance.
U.S. Appl. No. 12/498,204, mailed Apr. 26, 2011, Office Action.
U.S. Appl. No. 12/498,204, mailed Jul. 21, 2011, Notice of Allowance.
U.S. Appl. No. 12/498,204, mailed Jul. 28, 2011, Notice of Allowance.
U.S. Appl. No. 12/498,204, mailed Oct. 25, 2011, Notice of Allowance.
U.S. Appl. No. 12/498,204, mailed Feb. 1, 2012, Office Action.
U.S. Appl. No. 12/498,204, mailed Mar. 26, 2012, Notice of Allowance.
U.S. Appl. No. 12/498,204, mailed May 29, 2012, Notice of Allowance.
U.S. Appl. No. 12/498,204, mailed Jul. 4, 2012, Issue Notification.
U.S. Appl. No. 12/498,257, mailed Nov. 23, 2011, Office Action.
U.S. Appl. No. 12/498,257, mailed Jul. 3, 2012, Office Action.
U.S. Appl. No. 12/606,880, mailed Apr. 29, 2011, Office Action.
U.S. Appl. No. 12/606,880, mailed Aug. 15, 2011, Notice of Allowance.
U.S. Appl. No. 12/606,880, mailed Nov. 17, 2011, Notice of Allowance.
U.S. Appl. No. 12/606,880, mailed Feb. 16, 2012, Notice of Allowance.
U.S. Appl. No. 12/606,880, mailed May 23, 2012, Notice of Allowance.
U.S. Appl. No. 12/606,880, mailed Aug. 31, 2012, Notice of Allowance

* cited by examiner

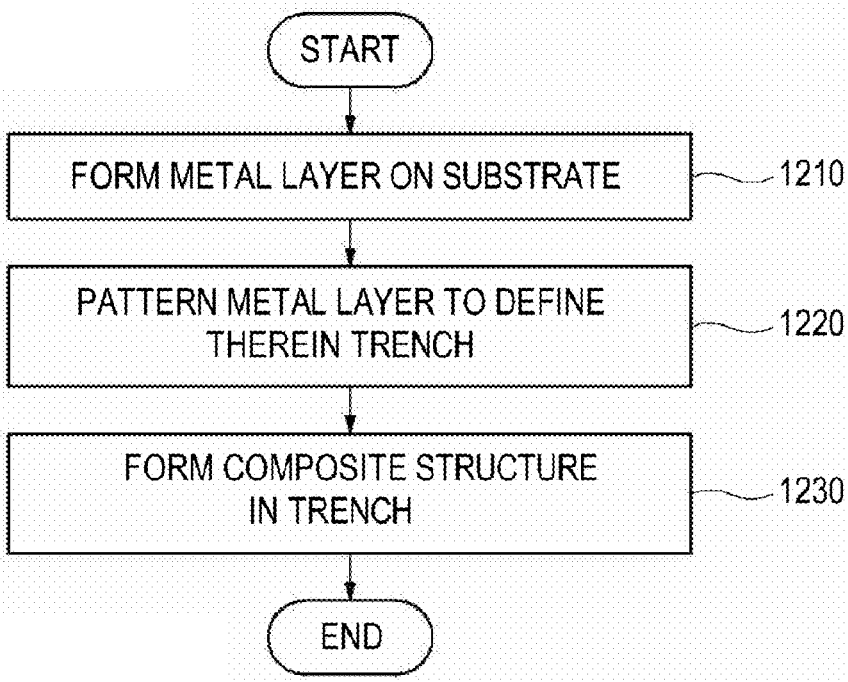
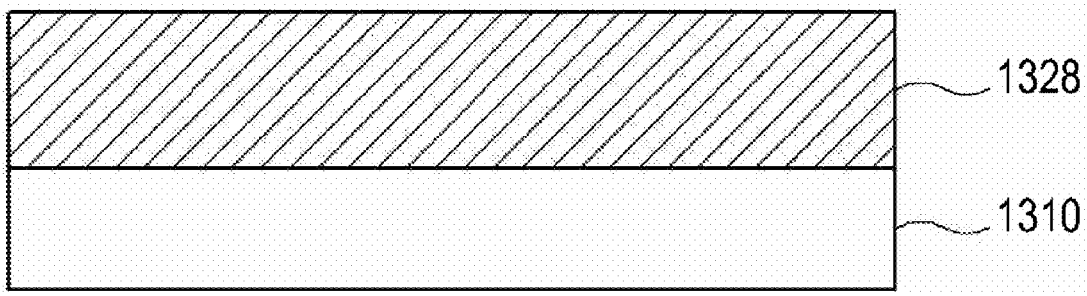

POLARITON MODE OPTICAL SWITCH WITH COMPOSITE STRUCTURE

TECHNICAL FIELD

The described technology generally relates to optical switches and, more particularly, to polariton mode optical switches.

BACKGROUND

Optical switches are commercially important for use in a wide range of applications. For example, multiple optical switches may be used in optical information processing and optical communications.

SUMMARY

Devices, methods, and techniques for frequency-dependent optical switching are provided. In one embodiment, a device includes a substrate, a first optical-field confining structure located on the substrate, a second optical-field confining structure located on the substrate, and a composite structure located between the first and second optical-field confining structures. The second optical-field confining structure may be spaced apart from the first optical-field confining structure. The composite structure may include an embedding structure with a surface to receive photons and multiple quantum structures located in the embedding structure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 12 shows a flow chart of an illustrative embodiment of a method for fabricating an optical switching device with quantum dots.

FIGS. 13A-13C are a series of diagrams illustrating the method shown in FIG. 12.

DETAILED DESCRIPTION

Figure 1:
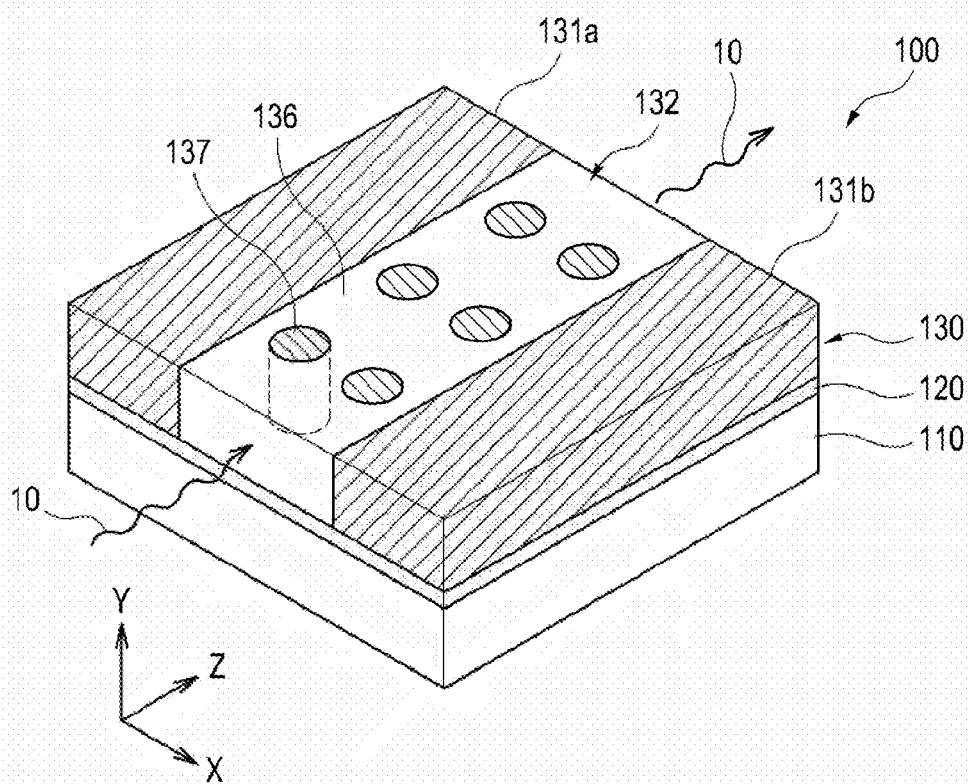
FIG. 1 shows a perspective view of an illustrative embodiment of an optical switching device with quantum wires.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 shows a perspective view of an illustrative embodiment of an optical switching device 100. As depicted, optical switching device 100 may include a substrate 110, a buffer layer 120 (optional) that may be located on substrate 110, and an optical switching unit 130 located on buffer layer 120.

In one embodiment, substrate 110 may be made of sapphire. In other embodiments, substrate 110 may be made of appropriate semiconductor materials. Examples of such semiconductor materials include, but are not limited to, silicon (Si), germanium (Ge), or gallium arsenide (GaAs). Buffer layer 120 may be made of a material that is substantially lattice-matched to the underlying substrate 110 and/or the overlying optical switching unit 130. In one embodiment, buffer layer 120 may be made of one or more materials lattice matched to substrate 110. Examples of such materials include, but are not limited to, GaAs, InGaAs, or AlGaAs.

Optical switching unit 130 is configured to receive photons 10 through a portion thereof, determine the wavelength of the received photons 10, and if the received photons 10 are of a prescribed wavelength, output the received photons 10, for example, through another portion thereof In one embodiment, optical switching unit 130 may include multiple optical-field confining structures, such as optical-field confining structures 131a and 131b (hereinafter collectively referred to as optical-field confining structures 131), which are spaced apart from each other by a prescribed distance, and a composite structure, such as a composite structure 132, which is located between optical-field confining structures 131. As used herein, the term "composite structure" refers to a structure including an embedding structure and one or more quantum structures embedded therein as reinforcing structures. Examples of quantum structures include, but are not limited to, a quantum wire or a quantum dot. In one embodiment, as shown in FIG. 1, composite structure 132 may include an embedding structure 136 and multiple quantum wires 137 embedded therein.

In one embodiment, optical switching unit 130 may receive photons 10 through a surface of composite structure 132 (hereinafter referred to as "photon input surface") and, if photons 10 are of a prescribed wavelength, output them (i.e., photons 10 of the prescribed wavelength) through another surface of composite structure 132 (hereinafter referred to as "photon output surface"). If photons 10 are not of the prescribed wavelength, optical switching unit 130 does not transmit the received photons 10 that are not of the prescribed wavelength.

The physical operation of optical switching unit 130 may be qualitatively described as follows. As photons 10 are received through the photon input surface and travel through optical switching unit 130 along the z-axis shown in FIG. 1, optical fields may be produced in composite structure 132. These optical fields may lead to coupling of electrons in quantum wires 137 of composite structure 132 with photons 10 traveling therethrough, to produce polaritons in quantum wires 137. For ease of explanation, the mode of operation of an optical switching unit in which the polaritons are induced in quantum structures (for the embodiment shown in FIG. 1, quantum wires 137) will be referred to as "polariton mode."

Describing the polariton mode in more detail, one of quantum wires 137 of optical switching unit 130 may have a strongly interacting Bose-Hubbard Hamiltonian characteristic as represented by Equation 1 below.

$$H = \sum_i H_i^{JC} - \sum_{i,j} K_{ij} a_i^\dagger a_j - \sum_i \mu_i N_i \quad \text{[Equation 1]}$$

where i and j are integers, $H_i^{JC}$ is a Jaynes-Cummings Hamiltonian for the photons and electron(s) at the $i^{th}$ quantum structure, $K_{ij}$ is the coupling constant between the $i^{th}$ and $j^{th}$ quantum structures, $\mu_i$ is the chemical potential of the $i^{th}$ quantum structure, $N_i$ is the total number of atomic and photonic excitations in the $i^{th}$ quantum structure, and $\alpha_i^\dagger$ is the creation operator of the photon at the $i^{th}$ quantum structure.

The Jaynes-Cummings Hamiltonian in Equation 1 may be expressed as Equation 2 below (the subscript "i" of $H_i^{JC}$ is omitted for simplicity).

$$H^{JC} = \in \sigma_+ \sigma_- + \omega a^\dagger a + \beta(\sigma_+ a + \sigma_- a^\dagger) \quad \text{[Equation 2]}$$

where $\in$ is the energy level difference between the electronic ground state $|g\rangle$ and the excited state $|e\rangle$ of the $i^{th}$ quantum structure, $\omega$ is the photon energy, $\beta$ is the electron-photon coupling constant, $\sigma_+$ and $\sigma_-$ respectively are the atomic raising operator $|e\rangle\langle g|$ and the atomic lowering operator $|g\rangle\langle e|$.

Quantum wires 137 may have at least two discrete electron energy level states (e.g., a ground state and an excited state). The energy required to excite the electron in the lower electron energy level state to the higher electron energy level state may be referred to as "transition energy" of a quantum wire. The difference between the transition energy and the energy of photons 10 of a specific wavelength may be referred to as "detuning $\Delta$." The detuning $\Delta$ may be expressed by Equation 3 below.

$$\Delta = \omega - \in \quad \text{[Equation 3]}$$

where $\in$ is the energy level difference between the electronic ground state $|g\rangle$ and the excited state $|e\rangle$ of a quantum structure, $\omega$ is the energy of the photon input to the quantum structure, and $\Delta$ is the detuning variable.

Strong optical fields in quantum wires 137 may lead to coupling of an electron(s) in quantum wires 137 with the photon(s) passing therethrough. This produces a dressed state (i.e., a combined state of n photons with excited electron(s), or n polaritons, where n is a natural number) in each of quantum wires 137, which is an eigenstate of the Jaynes-Cummings Hamiltonian. Then polaritons may be described by Equation 4 below.

$$E_n^\pm = n\omega - \Delta/2 \pm \chi(n), \chi(n) = \sqrt{\beta^2 n + \Delta^2/4} \quad \text{[Equation 4]}$$

$$|\pm n\rangle = \frac{[-(\Delta/2 \mp \chi(n))|g, n\rangle + \beta\sqrt{n}|e, n-1\rangle]}{\sqrt{2\chi^2(n) \mp \Delta\chi(n)}}$$

where $E_n^\pm$ is the polariton energy of the n polaritons, n is the number of photons, $\omega$ is the photon energy, $\beta$ is the electron-photon coupling constant, $\Delta$ is the detuning variable, $|\pm n\rangle$ is the n-polaritons or the polariton state, $|g,n\rangle$ is the state in which the electron(s) are in the ground state with n photons, and $|e,n-1\rangle$ s the state in which the electron(s) in the excited state are with n-1 photons.

When in the polariton mode, optical switching unit 130, depending on the wavelength of photons 10, may selectively operate in either a superfluid mode or a mott insulator mode. The superfluid mode is a mode in which photons 10 in one of quantum wires 137 are allowed to hop to an adjacent quantum wire 137. The mott insulator mode is a mode in which photons 10 in one of quantum wires 137 are not allowed to hop to an adjacent quantum wire 137. When in the superfluid mode, since photons 10 are allowed to hop through quantum wires 137, optical switching unit 130 may transmit the received photons 10. In contrast, when in the mott insulator mode, since photons 10 are not allowed to hop through quantum wires 137, optical switching unit 130 does not transmit received photons 10.

The transition between the photon-blockade mode and the superfluid mode is determined by the order parameter $\Psi = \langle \alpha_i \rangle = \langle n\pm|\alpha_i|n\pm\rangle$. When the angular frequency of photons 10 match that of the transition energy or the electron energy level separation of quantum wires 137 (i.e., when $\Delta$ is zero), $\Psi$ is equal to or near zero. In this case, the tunneling of photons 10 through adjacent quantum wires 137 may dominate over the repulsive interactions between photons 10 in quantum wires 137, and optical switching unit 130 may operate in the superfluid mode. For cases where $\Delta$ is not zero, $\Psi$ is not equal to or near zero. In this case, the repulsive interactions between photons 10 may dominate over the tunneling in quantum wires 137, and optical switching unit 130 may operate in the mott-insulator mode.

Quantum wires 137 may be made of one or more semiconductor materials, which may be selected based on the wavelength of the photons that are to be transmitted by optical switching unit 130. In one embodiment, quantum wires 137 may be made of one or more materials selected from the group consisting essentially of Group I-VII semiconductor compounds, Group II-VI semiconductor compounds and Group III-V semiconductor compounds. For example, quantum wires 137 may be made of $Cd_xZn_{1-x}S$, where the value of x is between about 0 and about 1.0. In this example, for optical switching unit 130 that is to transmit the photons having a wavelength of about 450 nm (i.e., blue spectrum light), quantum wires 137 may be made of $Cd_xZn_{1-x}S$, where the value of x is between about 0.5 and about 1.0. In another example, quantum wires 137 may be made of $CdSe_xS_{1-x}$, where the value of x is between 0 and 1. In this example, for optical switching unit 130 that is to transmit the photons having wavelength of about 520 nm (i.e., green spectrum light), quantum wires 137 may be made of $CdSe_xS_{1-x}$, where the value of x is between about 0 and about 0.4. Further, for optical switching unit 130 that is to transmit the photons having wavelength of about 633 nm (i.e., red spectrum light), quantum wires 137 may be made of $CdSe_xS_{1-x}$, where the value of x is between about 0.6 and about 1.0.

Optical switching unit 130 may be controlled by using a control light signal. For example, a control light signal of a prescribed wavelength may be supplied in conjunction with a data light signal of another prescribed wavelength. If the combined energy of the control light signal and the data light signal is substantially equal to the transition energy of quantum wires 137 (i.e., Δ is zero), then the control light signal and the data light signal may pass through optical switching unit 130. If the combined energy of the control light signal and the data light signal is not substantially equal to the transition energy, then the control light signal and the data light signal may be blocked by optical switching unit 130. The wavelength of the control light signal may be varied to selectively perform on/off switching on the data light signal of a prescribed wavelength.

Optical switching unit 130 may function as a wavelength-selective optical switch if the optical field of photons 10 travelling therethrough are confined in quantum wires 137. This is because stronger optical fields in quantum wires 137 may help optical switching unit 130 to operate in the polariton mode and, thus, operate as a wavelength-selective optical switch. Optical-field confining structures 131 disposed at the opposite ends of composite structure 132 may assist to better confine the optical fields to quantum wires 137 of composite structure 132.

Figure 2:
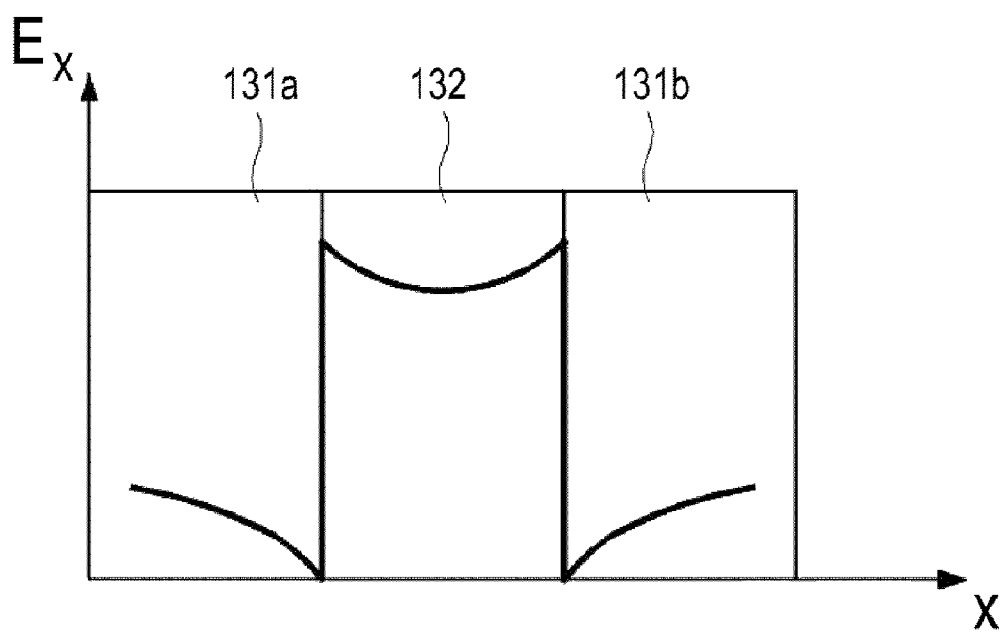
FIG. 2 illustrates an electric field between two elongated metal structures of the optical switching device shown in FIG. 1

In one embodiment, as shown in FIG. 1, optical-field confining structures 131 may include multiple elongated metal structures 131a and 131b spaced apart by a prescribed distance. Hereinafter, optical-field confining structures 131 will also be referred to as elongated metal structures 131. Two elongated metal structures 131 can function as a surface plasmon waveguide. FIG. 2 illustrates an electric field between two elongated metal structures 131 (e.g., optical-field confining structures 131a and 131b) of optical switching device 100 shown in FIG. 1. Referring to FIG. 2, the electric fields confined between elongated metal structures 131a and 131b shown in FIG. 1 may be explained by Equation 5 below.

$$\frac{D_{x\_quantum}}{D_{x\_metal}} = \frac{\varepsilon_{quantum} E_{x\_quantum}}{\varepsilon_{metal} E_{x\_metal}} = 1 \quad \text{[Equation 5]}$$

$$\therefore \frac{E_{x\_quantum}}{E_{x\_metal}} = \frac{\varepsilon_{metal}}{\varepsilon_{quantum}}$$

where $D_{x\_metal}$ is an electric displacement field in elongated metal structure 131a or 131b along the x-axis, $D_{x\_quantum}$ is an electric displacement field in composite structure 132 along the x-axis, $E_{x\_metal}$ is an electric field in elongated metal structure 131a or 131b along the x-axis, $E_{x\_quantum}$ is an electric field in composite structure 132 along the x-axis, and $\in_{metal}$ is the permittivity of elongated metal structure 131a or 131b, and $\in_{dielectric}$ is the permittivity of composite structure 132.

As can be seen in FIG. 2 and from Equation 5, the electric field of photons 10 confined between elongated metal structures 131a and 131b (i.e., in composite structure 132) is proportional to the ratio between the permittivity of elongated metal structure 131a or 131b and the permittivity of composite structure 132. Thus, the desired confinement of the electrical field may be obtained by selecting a material(s) of appropriate permittivity for elongated metals structures 131 and/or composite structure 132.

In one embodiment, elongated metal structures 131 may include one or more various kinds of metals. The permittivity of a metal is a function of frequency and, thus, the metal-type used may depend on the frequency or wavelength of photons 10 that are to be transmitted by optical switching unit 130. In one embodiment, elongated metal structures 131 may include a metal with a proper permittivity for a specific spectrum (e.g., the red, green, or blue spectrum). For example, elongated metal structures 131 configured to detect the photons in the blue spectrum may include one or more metals having a maximum permittivity in the blue spectrum. Examples of such metals include, but are not limited to, Ag, Al, Au, Ni, or Ti.

Considering that the permittivity of a metal is generally much higher than that of a dielectric material (e.g., the material of embedding structure 136 and quantum wires 137 of composite structure 132), the arrangement of elongated metal structures 131 may generally enable a strong confinement of the electric field of photons 10. This holds true even for the case where two adjacent elongated metal structures 131 are spaced apart by a distance smaller than the wavelength of photons 10. In one embodiment, two adjacent elongated metal structures 131 may be spaced apart by a distance equal to or smaller than the wavelength of the photons that are to be transmitted by optical switching unit 130. In another embodiment, two adjacent elongated metal structures 131 may be spaced apart by a distance equal to or smaller than one quarter of the wavelength of the incident photons that are to be transmitted by optical switching unit 130. For example, in cases where the frequency of the photons to be transmitted by optical switching unit 130 is about 1 μm, optical switching unit 130 may be fabricated in a manner such that two elongated metal structures 131 are spaced apart by a distance smaller than about 250 nm. In some embodiments, two elongated metal structures 131 may be spaced apart by a distance that is in the range from about a few nanometers to a few hundred nanometers. Elongated metal structures 131 illustrated in FIG. 1 are in contact with composite structure 132. In other embodiments, however, elongated metal structures 131 may be spaced apart from composite structure 132 such that the distance between two elongated metal structures 131 is lager than the width of composite structure 132.

In one embodiment, the width, the thickness, and the length of composite structures 132 may respectively be in the range of a few to a few tens of nanometers, a few hundred nanometers to a few hundred micrometers, and a few hundred nanometers to a few tens of micrometers. Also, in one embodiment, the diameter and the height of quantum wires 137 may respectively be in the range of a few nanometers and a few tens to a few hundred nanometers.

Figure 3A:
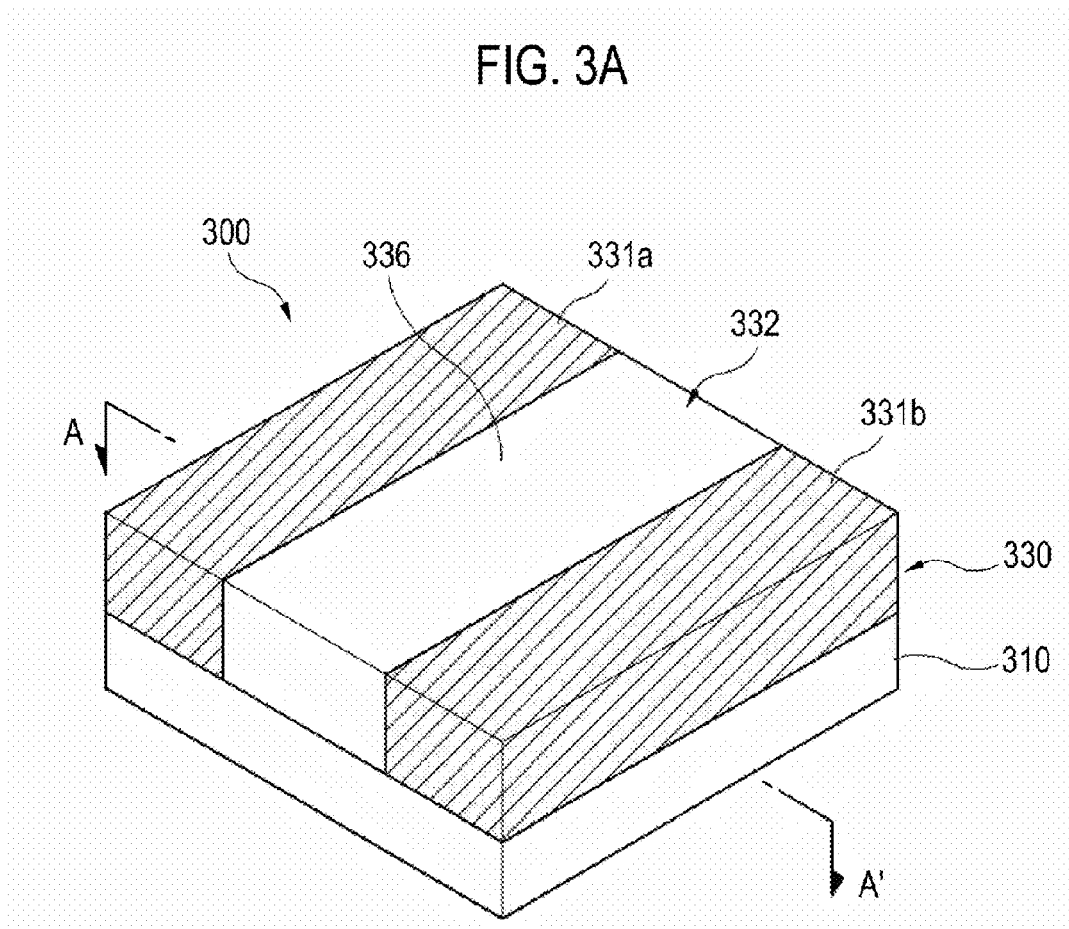
FIG. 3A shows a perspective view of an illustrative embodiment of an optical switching device with quantum dots.
Figure 3B:
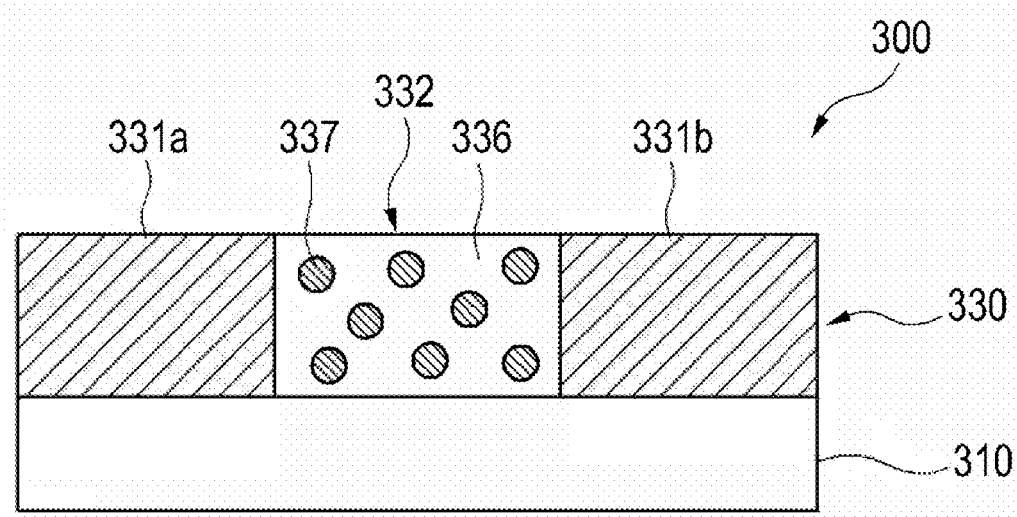
FIG. 3B shows a cross-sectional view of the optical switching device shown in FIG. 3A taken along lines A-A'.

Optical switching device 100 described in conjunction with FIG. 1 employs quantum wires 137 as its quantum structures embedded in composite structure 132. However, it should be appreciated that an optical device in accordance with the present disclosure may include different types of quantum structures. For example, the composite structure may include multiple quantum dots. In this regard, FIG. 3A shows a perspective view of an illustrative embodiment of an optical switching device 300 with quantum dots, and FIG. 3B shows a cross-sectional view of optical switching device 300 shown in FIG. 3A taken along lines A-A'. Similar to optical switching device 100 illustrated in FIG. 1, optical switching device 300 may include a substrate 310 and an optical switching unit 330 located on substrate 310. While not shown in FIGS. 3A and 3B, in some embodiments, optical switching device 300 may optionally further include a buffer layer disposed between substrate 310 and optical switching unit 330. Optical switching unit 330 may include multiple elongated metal structures 331a and 331b (hereinafter collectively referred to as "elongated metal structures 331") and a composite structure 332. Composite structure 332 may include an embedding structure 336 and multiple quantum dots 337 embedded therein. In one embodiment, embedding structure 336 may be made of one or more porous materials. In the above embodiment, multiple quantum dots 337 may be disposed in the pores of embedding structure 336. Examples of such porous materials include, but are not limited to, zeolite, silica, diatomite earth, pearlite or mulite. In another embodiment, embedding structure 336 may be made of one or more polymer materials. Examples of such polymer materials include, but are not limited to, polyamide, ionomer, polycarbonate, polyurethane, polystyrene, polyethylene, or fluoropolymer. Quantum dots 337 may be substantially spherical in shape with diameters ranging from about 1 nm to about 30 nm. In other embodiments, the diameter of quantum dots 337 may range from about 1 nm to about 9 nm.

Figure 4:
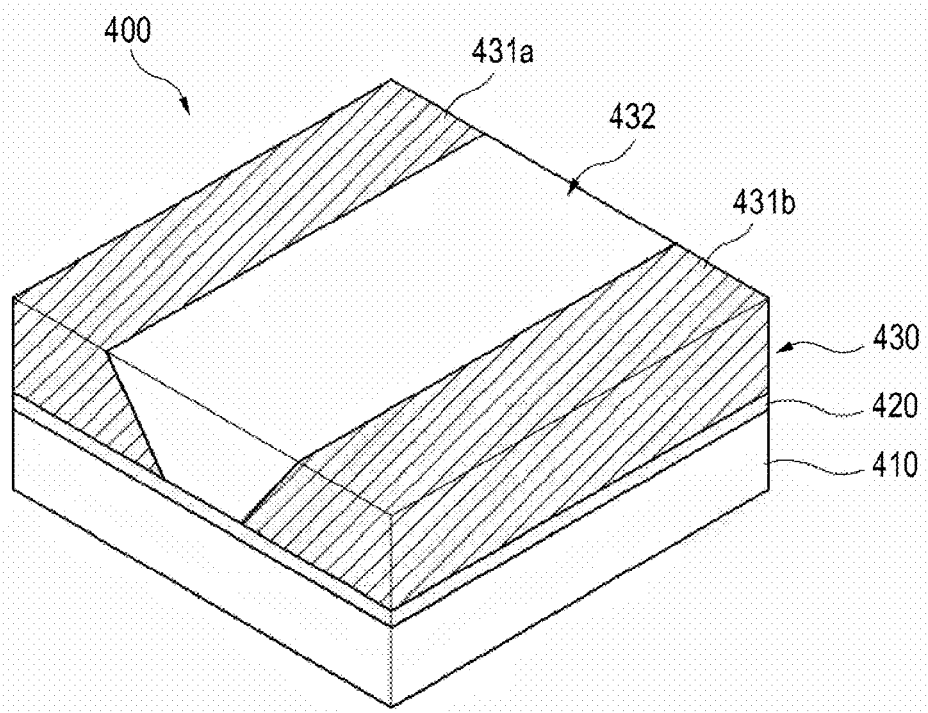
FIG. 4 shows a perspective view of an illustrative embodiment of an optical switching device with wedge-shaped metal structures.

Optical switching devices 100 and 300 described in conjunction with FIG. 1 and FIGS. 3A and 3B respectively employ elongated metal structures 131 and 331 of a substantially rectangular shape as their optical-field confining structures. However, it should be appreciated that an optical switching device in accordance with the present disclosure may include metal structures of a different shape. For example, the optical-field confining structures may include multiple elongated wedge-shaped metal structures. In this regard, FIG. 4 shows a perspective view of an illustrative embodiment of an optical switching device 400 with elongated wedge-shaped metal structures 431a and 431b. Similar to optical switching device 100 illustrated in FIG. 1, optical switching device 400 may include a substrate 410, a buffer layer 420 located on substrate 410, and an optical switching unit 430 located on buffer layer 420. Optical switching unit 430 may include multiple elongated wedge-shaped metal structures 431a and 431b, and a composite structure 432 with a trapezoidal cross-section disposed between elongated wedge-shaped metal structures 431a and 431b.

Figure 5:
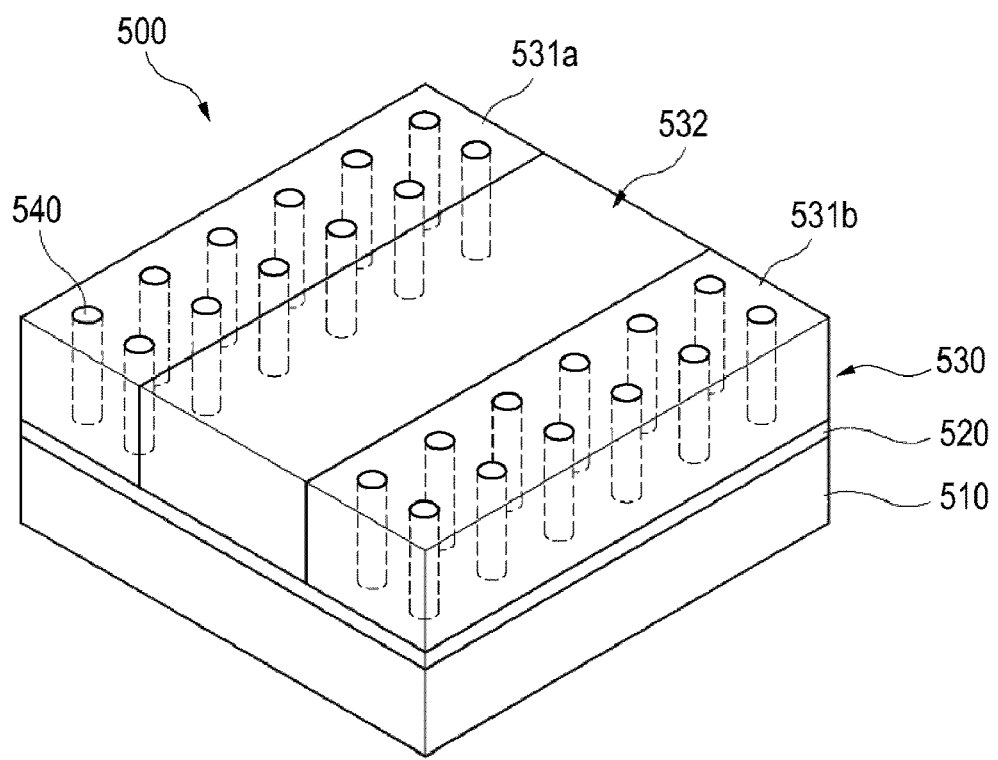
FIG. 5 shows a perspective view of an illustrative embodiment of an optical switching device with photonic crystals.

Further, the optical-field confining structures of the present disclosure are not limited to the metal structures acting as a surface plasmon waveguide(s). In some embodiments, photonic crystals may be employed as the optical-field confining structures. In this regard, FIG. 5 shows a perspective view of an illustrative embodiment of an optical switching device 500 with such photonic crystals 531a and 531b. Similar to optical switching device 100 illustrated in FIG. 1, optical switching device 500 may include a substrate 510, a buffer layer 520 located on substrate 510, and an optical switching unit 530 located on buffer layer 520. Optical switching unit 530 may include multiple photonic crystals 531a and 531b, and a composite structure 532 disposed between photonic crystals 531a and 531b.

Photonic crystals 531a and 531b may include multiple dielectric or metallo-dielectric nanostructures. In one embodiment, as illustrated in FIG. 5, photonic crystals 531a and 531b may be a dielectric structure with a multiple number of holes 540 defined therein. In one embodiment, holes 540 may be spaced apart by the same prescribed distance. The diameter of holes 540 may be in the nanometer range. In other embodiments, however, other types of photonic crystals may be employed. For example, photonic crystals with multiple nanorods spaced apart by the same distance may be used. The above arrangement of photonic crystals 531a and 531b may effectively confine the optical field of photons therebetween.

Figure 6:
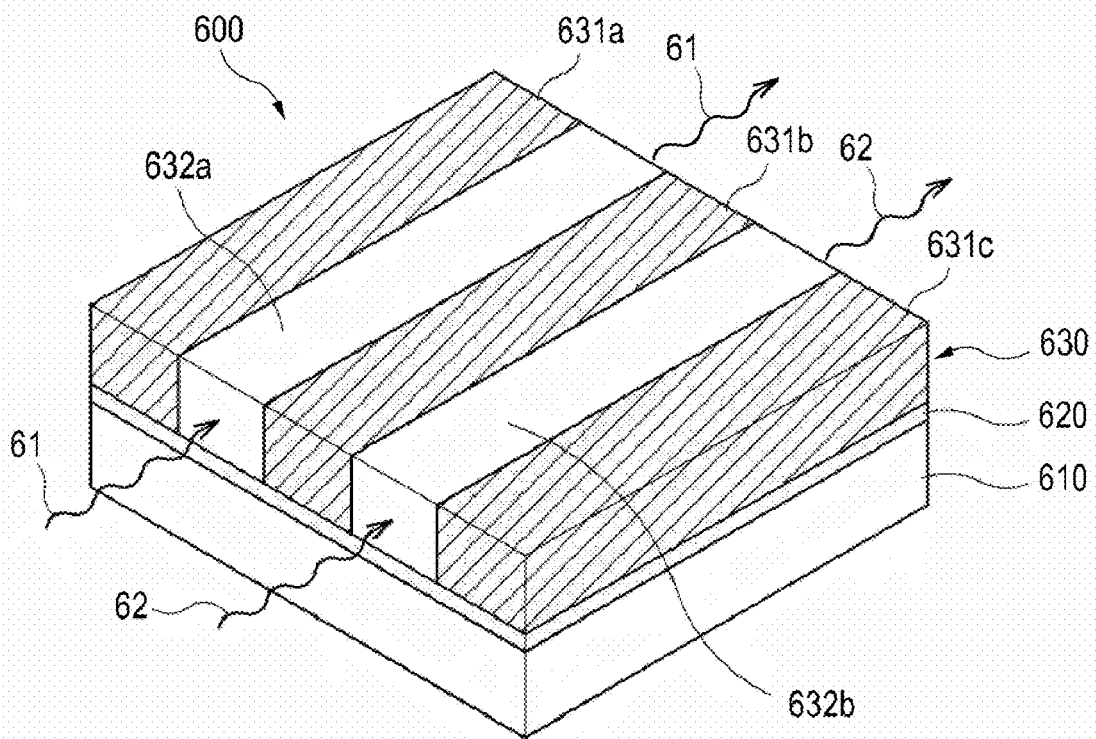
FIG. 6 shows a perspective view of an illustrative embodiment of an optical switching device with multiple composite structures.

Optical switching devices 100, 300, 400 and 500 described in conjunction with FIGS. 1, 3A, 3B, 4 and 5 include two optical-field confining structures and a composite structure disposed therebetween. However, it should be appreciated that an optical switching device in accordance with the present disclosure may include more than two optical-field confining structures and more than one composite structure. In this regard, FIG. 6 shows a perspective view of an illustrative embodiment of an optical switching device 600 with multiple composite structures 632a and 632b. Similar to optical switching device 100 illustrated in FIG. 1, optical switching device 600 may include a substrate 610, a buffer layer 620 located on substrate 610, and an optical switching unit 630 located on buffer layer 620. Optical switching unit 630 may include three elongated metal structures 631a-631c, and two composite structures 632a and 632b disposed between elongated metal structures 631a-631c. Only two composite structures and three elongated metal structures are shown in FIG. 6 for simplicity and one skilled in the art will appreciate that there may be a different number of composite structures and/or elongated metal structures.

Composite structures 632a and 632b may respectively receive photons 61 and 62 through a surface thereof and, if photons 61 and 62 are of a prescribed wavelength, respectively output them (i.e., photons 61 and 62 of the prescribed wavelength) through another surface of composite structures 632a and 632b. If photons 61 are not of the prescribed wavelength, composite structures 632a and 632b do not transmit (i.e., output) received photons 61 and 62. In one embodiment, composite structures 632a and 632b may be configured to transmit photons of the same wavelength. In another embodiment, composite structures 632a and 632b may be configured to transmit photons of different wavelengths. For example, elongated metal structures 631a-631c and/or composite structures 632a and 632b (e.g., the quantum structures in composite structures 632a and 632b) may be made of different materials, such that composite structures 632a and 632b may transmit photons of different wavelengths.

In some cases, it may be desirable to prevent photons passing through the quantum structures of one composite structure 632a or 632b from hopping over to the quantum structures of another composite structure 632b or 632a. In one embodiment, optical switching unit 630 may be configured in a manner such that composite structures 632a and 632b are spaced apart by a distance equal to or greater than one quarter the wavelength(s) of the photons that are to be transmitted by composite structures 632a and 632b.

Figure 7:
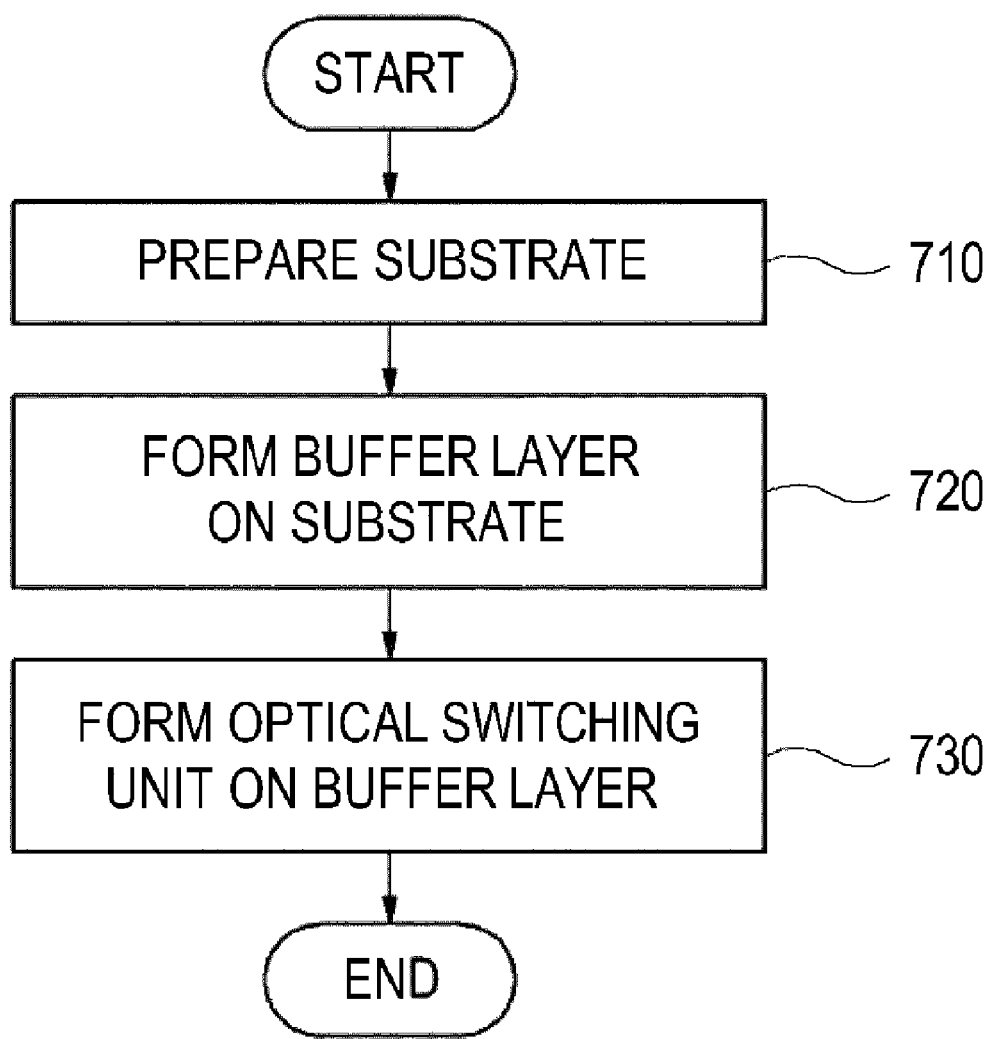
FIG. 7 shows a flow chart of an illustrative embodiment of a method for fabricating an optical switching device.

The aforementioned optical switching devices may be fabricated in a variety of ways, some of which are explained hereafter. FIG. 7 shows a flow chart of an illustrative embodiment of a method for fabricating an optical switching device. Referring to FIG. 7, in block 71 0, a substrate is prepared for the formation of an optical switching unit thereon. In block 720, a buffer layer is formed on the substrate, and in block 730, the optical switching unit is formed on the buffer layer. The optical switching unit may include multiple optical-field confining structures located on the substrate and spaced apart from each other, and one or more composite structures made of a dielectric material disposed between multiple optical-field confining structures.

The buffer layer and the optical switching unit may be formed on the substrate using any one or a combination of a variety of suitable deposition, etching, and/or photolithographic techniques known in the art. Examples of suitable deposition techniques include, but are not limited to, chemical depositions techniques (e.g., chemical vapor deposition (CVD), plasma enhanced CVD (PECVD)), physical deposition techniques (e.g., physical vapor deposition (PVD), or other deposition techniques (e.g., molecular beam epitaxy (MBE)). Examples of suitable etching techniques include, but are not limited to, wet etching, anisotropic etching, or plasma etching. Further, in some embodiments, the composite structure(s) of the optical switching unit may be formed by using one or any combination of a variety of suitable micro or nanofabrication techniques known in the art. Such techniques include, but are not limited to, spin-coating, drop casting, printing, stamping, or self-assembly.

The particular processes performed in forming the optical switching unit may vary depending on the type and shape of the optical-field confining structures and/or the composite structure(s) to be fabricated.

Figure 8:
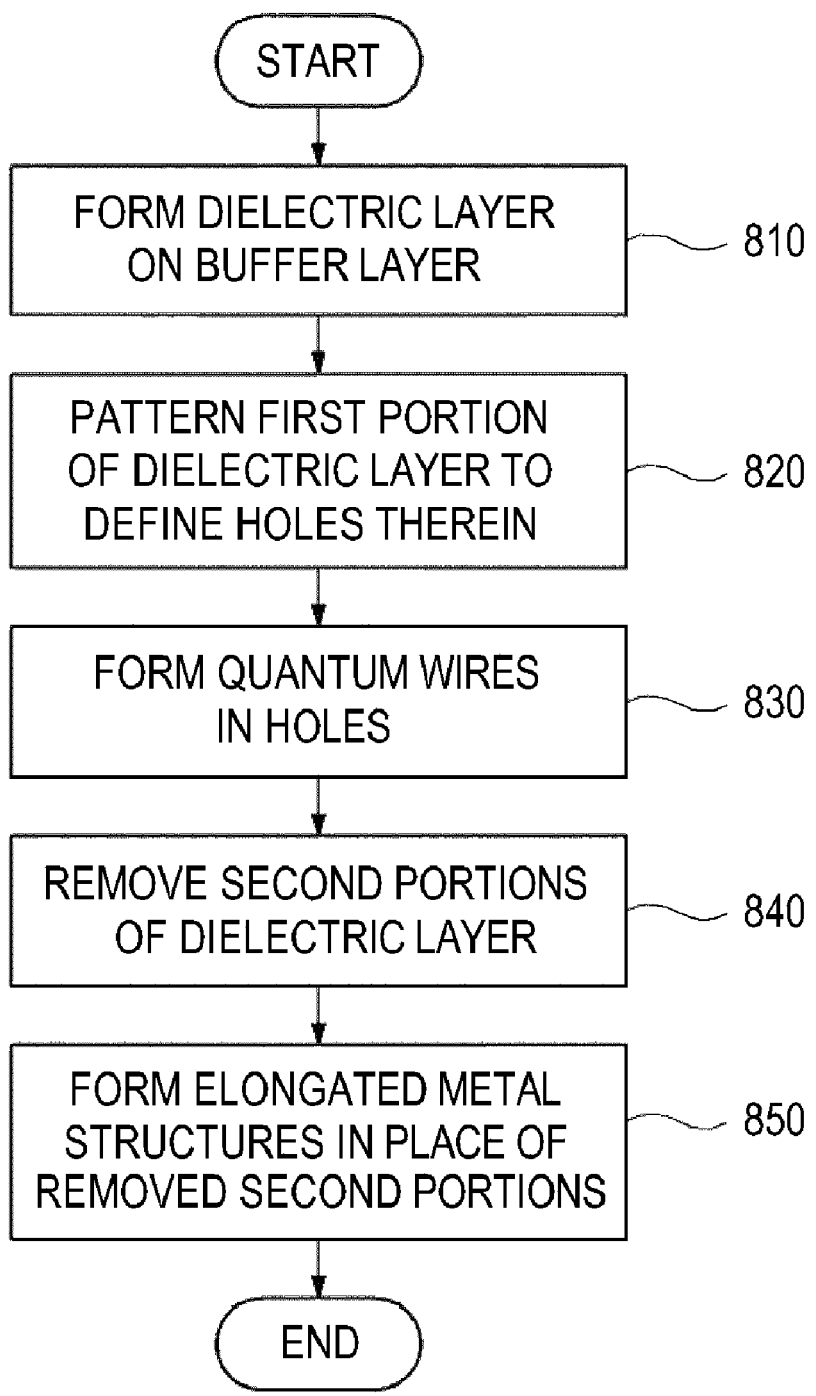
FIG. 8 shows a flow chart of an illustrative embodiment of a method for fabricating an optical switching unit with quantum wires.
Figure 9A:
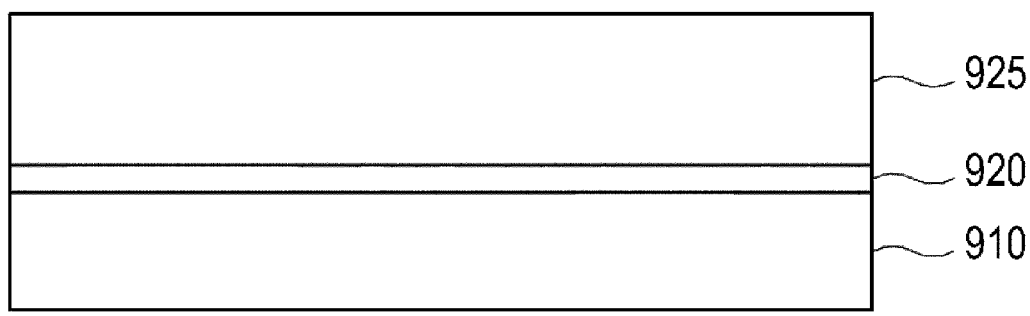
FIGS. 9A-9E are a series of diagrams illustrating the method shown in FIG. 8.
Figure 9B:
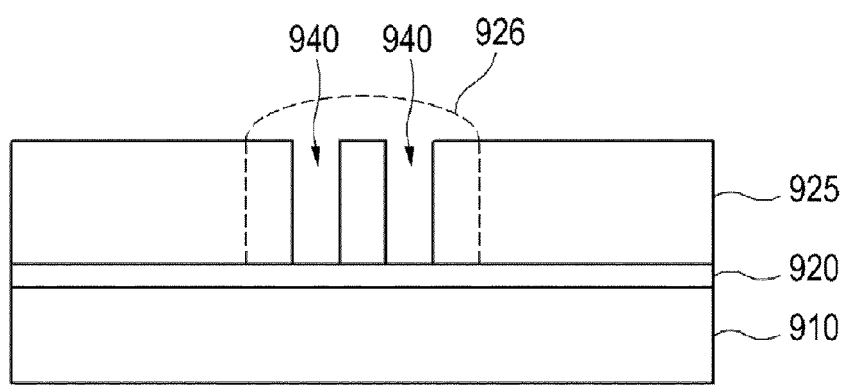
Figure 9C:
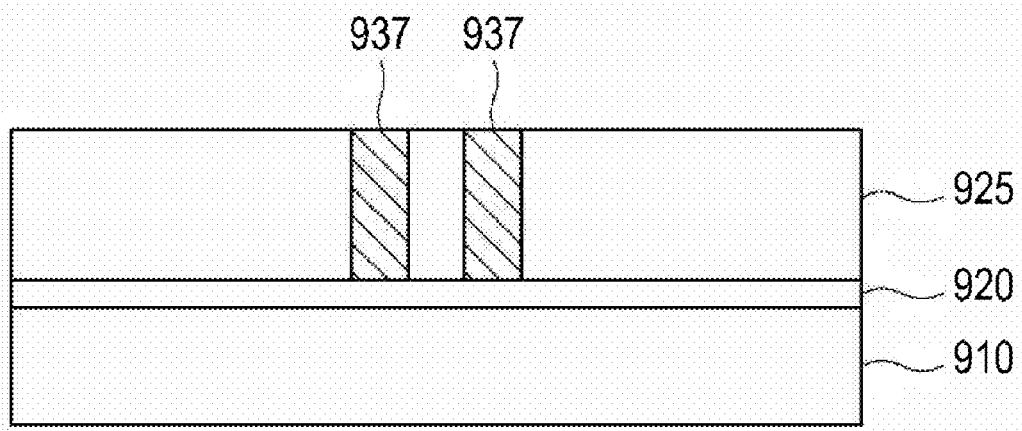
Figure 9D:
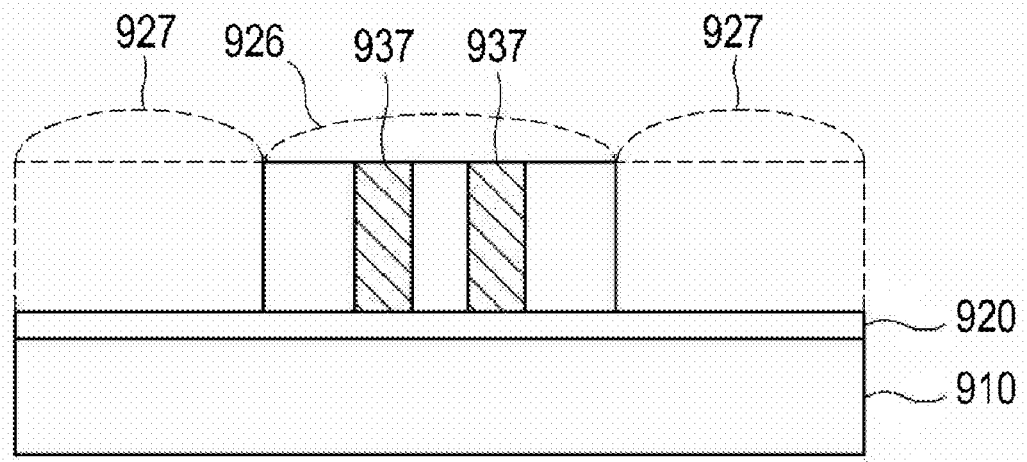
Figure 9E:
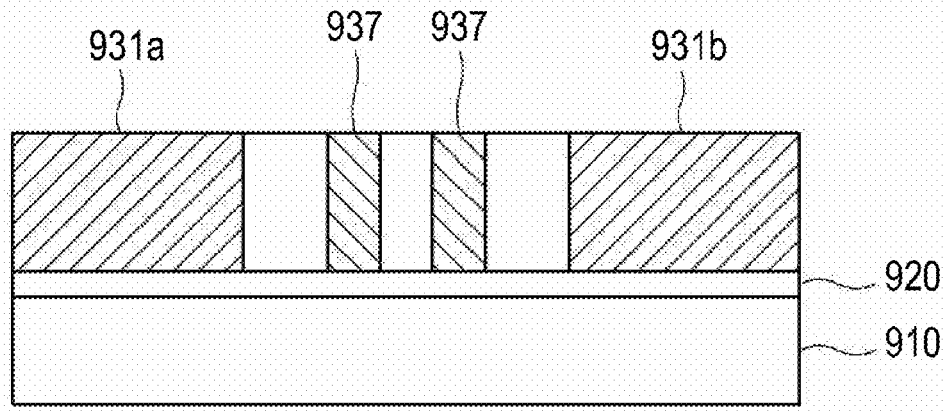

FIG. 8 shows a flow chart of an illustrative embodiment of a method for fabricating an optical switching unit with quantum wires. FIGS. 9A-9E are a series of diagrams illustrating the method shown in FIG. 8. Referring to FIG. 8, in block 810, a dielectric layer 925 is formed on a buffer layer 920 that is disposed on a substrate 910, as shown in FIG. 9A. In one embodiment, dielectric layer 925 may be formed by depositing dielectric material on buffer layer 920. In block 820, as shown in FIG. 9B, a first portion 926 of dielectric layer 925 is patterned to define therein multiple holes 940. In block 830, as shown in FIG. 9C, multiple quantum wires 937 are respectively formed in multiple holes 940. In block 840, as shown in FIG. 9D, second portions 927 of dielectric layer 925 are removed. In block 850, as shown in FIG. 9E, elongated metal structures 931a and 931b are formed in place of the removed second portions 927. The above forming, patterning, and removing processes may be performed by using any of a variety of suitable masking and/or etching processes known in the art (e.g., photolithography and plasma etching techniques).

The method described in conjunction with FIG. 8 fabricates an optical switching unit having elongated metal structures 931a and 931b as its optical-field confining structures. For cases where an optical switching unit having photonic crystals as its optical-field confining structures is to be fabricated, blocks 840 and 850 may be replaced with other operations. For example, second portions 927 of dielectric layer 925 may be patterned to define therein a multiple number of holes, thereby allowing for the forming of photonic crystals in second portions 927 of dielectric layer 925.

Figure 10:
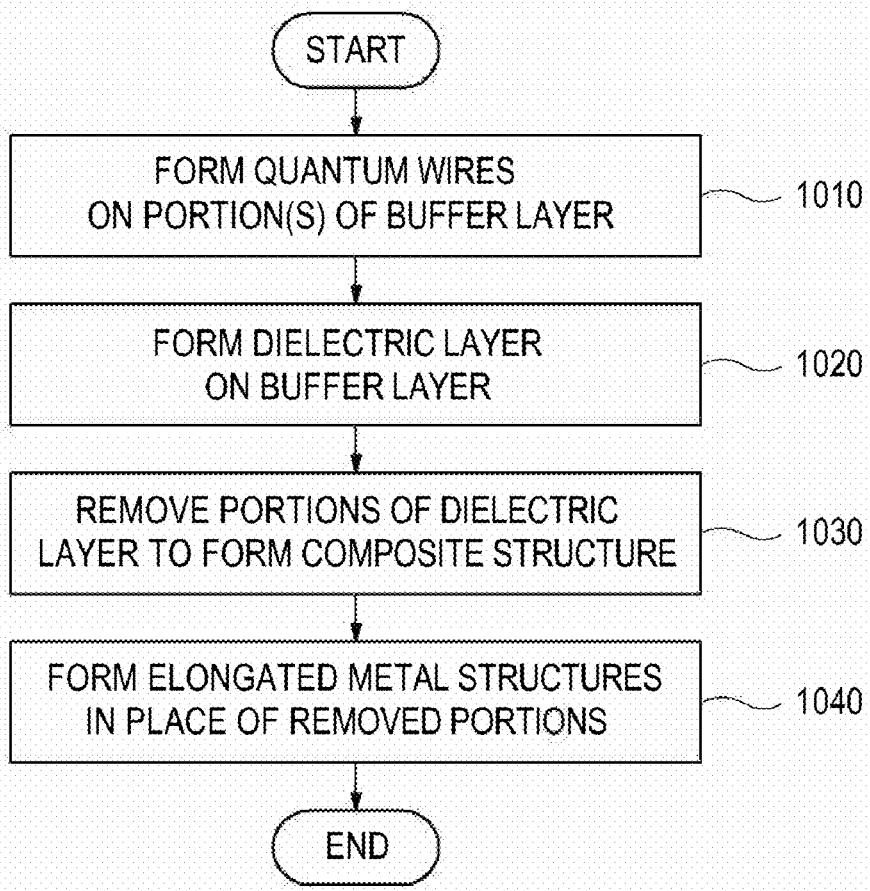
FIG. 10 shows a flow chart of another illustrative embodiment of a method for fabricating an optical switching unit with quantum wires.
Figure 11A:
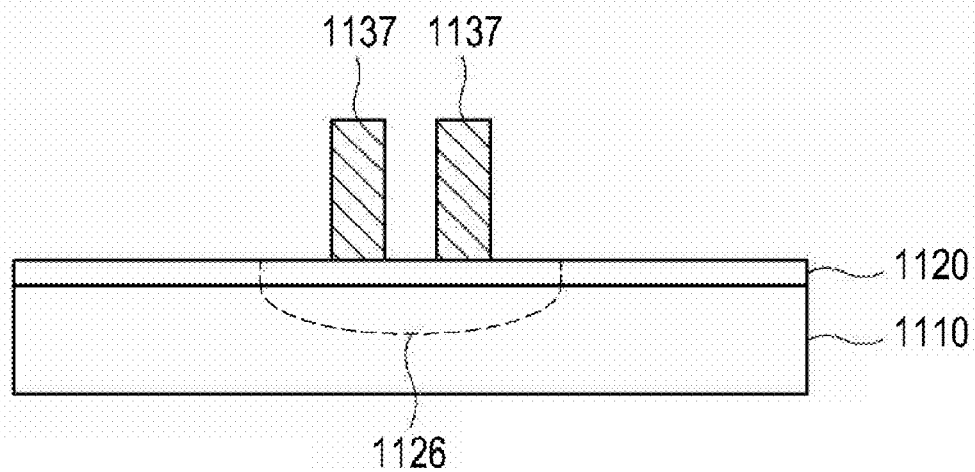
FIGS. 11A-11D are a series of diagrams illustrating the method shown in FIG. 10.

FIG. 10 shows a flow chart of another illustrative embodiment of a method for fabricating an optical switching device with quantum wires. FIGS. 11A-11D are a series of diagrams illustrating the method shown in FIG. 10. Referring to FIG. 10, in block 1010, quantum wires 1137 are formed on a portion 1126 of a buffer layer 1120 that is disposed on a substrate 1110, as shown in FIG. 11A. In one embodiment, quantum wires 1137 may be formed by using any one or a combination of a variety of known catalytic techniques, which use a catalyst(s) of one material in forming a quantum wire of a different material. Examples of such techniques include, but are not limited to, vapor-solid (VS) techniques or vapor-liquid-solid (VLS) techniques. For example, nano-sized droplets of catalyst material (e.g., Au, Fe, Co, Mo, Ga, Al, Ti, or Ni) may be deposited on portion 1126 of buffer layer 1120 and a gas mixture including one or more semiconductor material may be introduced to grow quantum wires 1137 under the droplets of catalyst material.

Figure 11B:
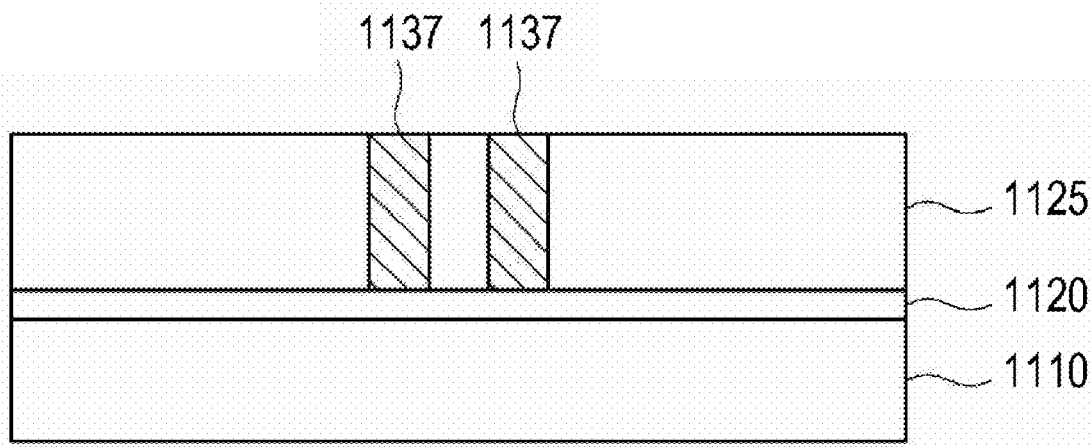
Figure 11C:
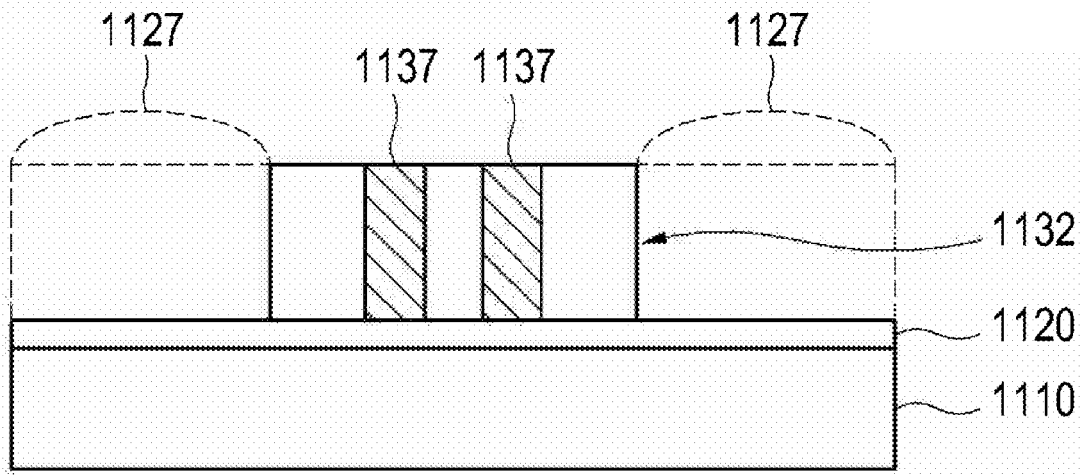
Figure 11D:
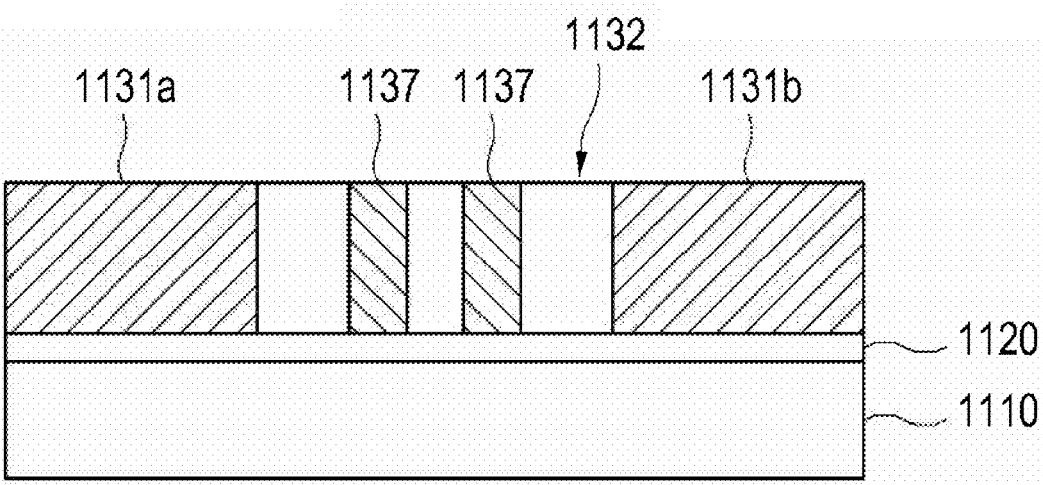

In block 1020, as shown in FIG. 11B, a dielectric layer 1125 is formed on buffer layer 1120. In one embodiment, dielectric layer 1125 may be formed to a thickness to expose at least some upper surfaces of quantum wires 1137. In other embodiments, dielectric layer 1125 may be formed to a thickness to completely bury quantum wires 1137 therein. Dielectric layer 1125 may be formed by using any one or a combination of a variety of suitable deposition techniques known in the art. In block 1030, as shown in FIG. 11C, portions 1127 of dielectric layer 1125 are removed to form a composite structure 1132. In block 1040, as shown in FIG. 11D, elongated metal structures 1131a and 1131b are formed in place of removed portions 1127 of buffer layer 1120. The above removing and forming process may be performed by using any one or a combination of a variety of suitable masking and/or etching processes known in the art (e.g., photolithography or plasma etching techniques).

Figure 13B:
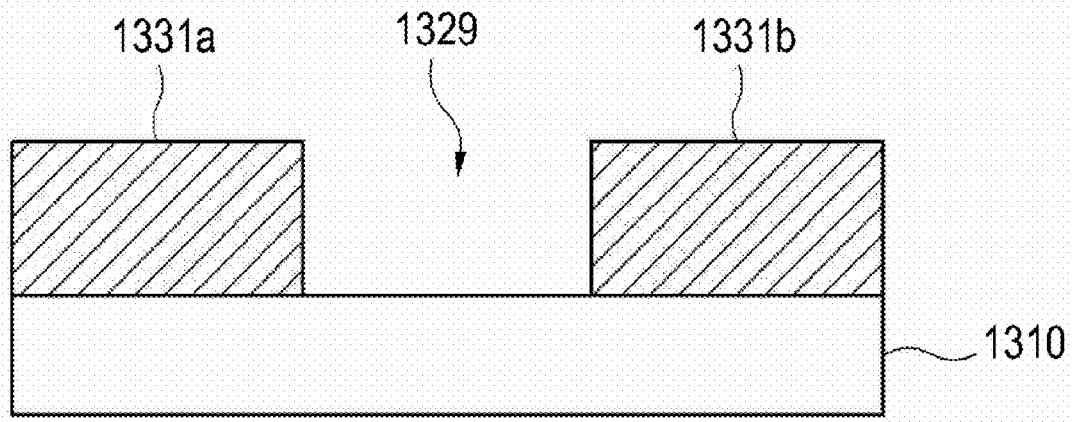
Figure 13C:
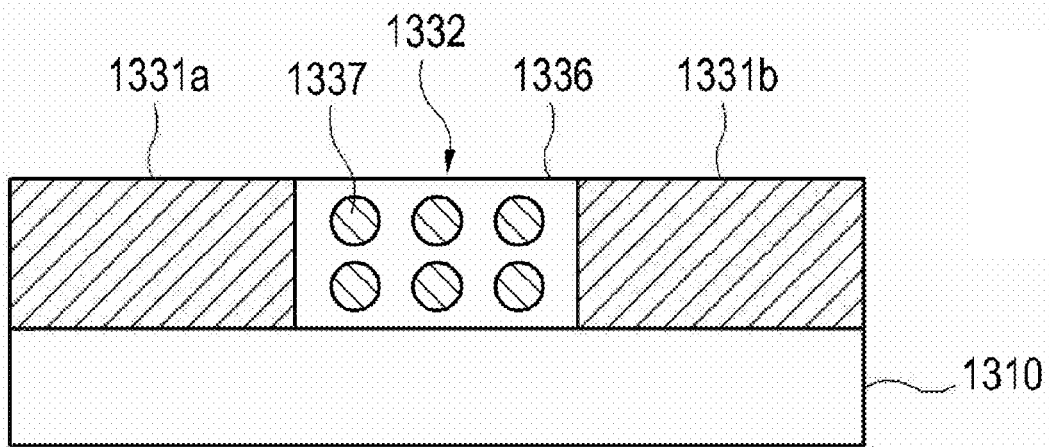

FIG. 12 shows a flow chart of an illustrative embodiment of a method for fabricating an optical switching unit with quantum dots in accordance with an illustrative embodiment. FIGS. 13A-13C are a series of diagrams illustrating the method shown in FIG. 12. Referring to FIG. 12, in block 1210, a metal layer 1328 is formed on a substrate 13 10, as shown in FIG. 13A. In block 1220, as shown in FIG. 13B, a portion of metal layer 1328 is removed to define therein a trench 1329 and form two elongated metal structures 1331a and 1331b. The above forming and removing processes may be performed by employing any one or a combination of a variety of suitable masking, deposition and/or etching processes known in the art (e.g., photolithography or plasma etching techniques).

In block 1230, as shown in FIG. 13C, a composite structure 1332, which includes an embedding structure 1336 and multiple quantum dots 1337 embedded therein, are formed in trench 1329 (i.e., between two elongated metal structures 1331a and 1331b). Composite structure 1332 may be formed by using any one or a combination of a variety of suitable micro or nanofabrication techniques known in the art. In one embodiment, composite structure 1332 may be formed by dispersing pre-fabricated quantum dots 1337 in a slurry or a solution including polymer materials and applying the slurry or the solution on the exposed portions of substrate 1310 as a film by spin-coating, drop casting, printing, doctor blade coating, or extrusion coating. The applied film may be dried and/or heated to form composite structure 1332. In another embodiment, composite structure 1332 may be formed by using a self-assembly process. The aforementioned composite structure forming processes are well known in the art and can be accomplished without the need of further explanation herein.

The method described in conjunction with FIG. 12 first forms elongated metal structures 1331a and 1331b and then composite structure 1332 therebetween. However, it should be appreciated that in other embodiments, composite structure 1332 may first be formed on substrate 1310 and elongated metal structures 1331a and 1331b may be formed thereafter. For example, a thin film may be applied on substrate 1310 and the outer portions of the thin film may be removed, thereby forming composite structure 1332. Thereafter, elongated metal structures 1331a and 1331b may be formed in place of the removed outer portions.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g. bodies of the appended claims) are generally intended as "open" terms (e.g. the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g. "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g. the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g. "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g. "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A device comprising:
   a substrate;
   a first optical-field confining structure located on the substrate;
   a second optical-field confining structure located on the substrate, the second optical-field confining structure spaced apart from the first optical-field confining structure; and
   a composite structure located between the first and second optical-field confining structures, the composite structure comprising:
   an embedding structure with a surface to receive photons, and
   a plurality of quantum structures located in the embedding structure,
   wherein the first optical-field confining structure and the second optical-field confining structure are configured to achieve a desired confinement of an electrical field of the photons having a wavelength in a specific spectrum, and
   wherein the first and second optical field confining structures are configured to substantially confine an optical field of the photons to enable the quantum structures to selectively operate in a mott insulator mode or a superfluid mode depending on a wavelength of the received photons.

2. The device of claim 1, wherein at least one of the first and the second optical-field confining structures is spaced apart from the composite structure.

3. The device of claim 1, wherein at least one of the first and the second optical-field confining structures is in contact with the composite structure.

4. A device comprising:
a substrate;
a first optical-field confining structure located on the substrate;
a second optical-field confining structure located on the substrate, the second optical-field confining structure spaced apart from the first optical-field confining structure;
a composite structure located between the first and second optical-field confining structures, the composite structure comprising:
an embedding structure with a surface to receive photons, and
a plurality of quantum structures located in the embedding structure,
wherein the first optical-field confining structure and the second optical-field confining structure are configured to achieve a desired confinement of an electrical field of the photons having a wavelength in a specific spectrum, and
wherein at least one of the first and the second optical-field confining structures is spaced apart from the composite structure.

5. The device of claim 1, wherein the first and the second optical-field confining structures are spaced apart by a distance equal to or less than a wavelength of the photons.

6. The device of claim 5, wherein the first and the second optical-field confining structures are spaced apart by a distance equal to or less than one quarter of the wavelength of the photons.

7. The device of claim 1, wherein the first and second optical-field confining structures are rectangular metal structures.

8. The device of claim 1, wherein the first and second optical-field confining structures are wedge-shaped metal structures.

9. The device of claim 1, wherein the first and second optical-field confining structures are made of at least one material selected from the group consisting essentially of Ag, Al, Au, Ni, and Ti.

10. A device comprising:
a substrate;
a first optical-field confining structure located on the substrate;
a second optical-field confining structure located on the substrate, the second optical-field confining structure spaced apart from the first optical-field confining structure;
a composite structure located between the first and second optical-field confining structures, the composite structure comprising:
an embedding structure with a surface to receive photons, and
a plurality of quantum structures located in the embedding structure,
wherein the first optical-field confining structure and the second optical-field confining structure are configured to achieve a desired confinement of an electrical field of the photons having a wavelength in a specific spectrum, and
wherein the first and the second optical-field confining structures are photonic crystals.

11. The device of claim 1, wherein the quantum structures are made of one or more materials selected from the group consisting essentially of Group I-VII semiconductor compounds, Group II-VI semiconductor compounds, and Group III-V semiconductor compounds.

12. The device of claim 1, wherein the quantum structures are made of $Cd_xZn_{1-x}S$, where the value of x is in a range from about 0.5 to about 1.0.

13. The device of claim 1, wherein the quantum structures are made of $CdSe_xS_{1-x}$, where the value of x is in a range from about 0 to about 1.

14. A device comprising:
a substrate;
a first optical-field confining structure located on the substrate;
a second optical-field confining structure located on the substrate, the second optical-field confining structure spaced apart from the first optical-field confining structure;
a composite structure located between the first and second optical-field confining structures, the composite structure comprising:
an embedding structure with a surface to receive photons; and
a plurality of quantum structures located in the embedding structure;
wherein the first optical-field confining structure and the second optical-field confining structure are configured to achieve a desired confinement of an electrical field of the photons having a wavelength in a specific spectrum, and
a buffer layer disposed between the substrate and the first and the second optical-field confining structures.

15. The device of claim 1, further comprising:
a third optical-field confining structure located on the substrate, the third optical-field confining structure spaced apart from the first and second optical-field confining structures; and
a second composite structure located between the second and third optical-field confining structures, the second composite structure comprising a second embedding structure with a second surface to receive second photons and a plurality of second quantum structures located in the second embedding structure.

16. The device of claim 15, wherein the composite structure and the second composite structure are spaced apart by a distance greater than a prescribed value, the prescribed value being the greater of a wavelength of the photons and a wavelength of the second photons.

17. A method for fabricating a device, the method comprising:
forming a first and a second optical-field confining structure on a substrate, the first and second optical-field confining structures being spaced apart from each other; and
forming a composite structure between the first and the second optical-field confining structures, the composite structure including an embedding structure with a surface to receive photons and a plurality of quantum structures located in the embedding structure, the first and second optical-field confining structures configured to:
achieve a desired confinement of an electrical field of the photons having a wavelength in a specific spectrum and
substantially confine an optical field of the photons to enable the quantum structures to selectively operate in a mott insulator mode or a superfluid mode depending on a wavelength of the received photons.

18. The method of claim 17, wherein forming the composite structure comprises:
forming a dielectric layer on the substrate;
patterning one or more first portions of the dielectric layer to define therein a plurality of holes; and
respectively forming the plurality of quantum structures in the plurality of holes, and
wherein forming the first and the second optical-field confining structures comprises:
removing second portions of the dielectric layer; and
respectively forming the first and the second optical-field confining structures in place of the removed second portions.

19. The method of claim 17, wherein forming the first and the second optical-field confining structures comprises:
forming a metal layer on the substrate; and
patterning the metal layer to form the first and the second optical-field structures, and
wherein forming the composite structure comprises:
forming the composite structure between the first and the second optical-field structures.

20. The method of claim 17, wherein the first and the second optical-field confining structures are spaced apart by a distance equal to or less than a wavelength of photons that are to be transmitted by the device.

21. The method of claim 20, wherein the first and the second optical-field confining structures are spaced apart by a distance equal to or less than one quarter of a wavelength of the photons that are to be transmitted by the device.

22. The method of claim 17, wherein the first and the second optical-field confining structures are metal structures.

23. The method of claim 17, wherein the first and the second optical-field confining structures are made of a material selected form the group consisting of Ag, Al, Au, Ni, and Ti.

24. The method of claim 17, wherein the first and the second optical-field confining structures are photonic crystals.

25. An optical switching device comprising:
a substrate;
a first optical-field confining structure located on the substrate;
a second optical-field confining structure located on the substrate, the second optical-field confining structure spaced apart from the first optical-field confining structure;
a composite structure located between the first and second optical-field confining structures, the composite structure comprising:
an embedding structure with a surface to receive photons, and
a plurality of quantum structures located in the embedding structure,
wherein the composite structure is configured to transmit photons having wavelength in a specific spectrum,
wherein the first optical-field confining structure and the second optical-confining structure are configured to achieve a desired confinement of an electrical field of the photons having wavelengths in the specific spectrum,
wherein the wavelength of the photons causes the quantum structures to selectively operate in a mott insulator mode that prevents transmission of the photons or a superfluid mode that allows transmission of the photons, and
wherein the composite structure is responsive to a control light signal to selectively vary the wavelength of the photons and determine whether the quantum structures operate in the mott insulator mode or the superfluid mode.

26. The optical switching device of claim 25, wherein the first and second optical-confining structures are:
spaced apart by a distance equal to or less than the wavelength of photons to be transmitted; or
spaced apart by a distance equal to or less than one quarter of a wavelength of the photons that are to be transmitted by the device.

* * * * *

UNITED STATES PATENT AND TRADEMARK OFFICE
CERTIFICATE OF CORRECTION

PATENT NO. : 8,368,990 B2
APPLICATION NO. : 12/545678
DATED : February 5, 2013
INVENTOR(S) : Ahn It is certified that error appears in the above-identified patent and that said Letters Patent is hereby corrected as shown below:

On the Title Page

Item (56), under "OTHER PUBLICATIONS", in Column 2, Line 1,
delete "al" and insert -- al., --, therefor at each occurrence throughout the other publications.

On Page 2, Item (56), under "OTHER PUBLICATIONS", in Column 1,
Line 11, delete "al." and insert -- al., --, therefor at each occurrence throughout the other publications.

On Page 2, Item (56), under "OTHER PUBLICATIONS", in Column 1,
Lines 19-20, delete "Nanothecnology. TNT2004. Phantoms Foundations. Segovia (Spain)." and insert -- Nanotechnology, TNT2004, Phantoms Foundations, Segovia (Spain), --, therefor.

On Page 2, Item (56), under "OTHER PUBLICATIONS", in Column 2,
Line 15, delete "injection". J. Appl. Phys. 64(1). Jul. 1, 2998," and insert -- injection", J. Appl. Phys. 64(1), Jul. 1, 1988, --, therefor.

On Page 2, Item (56), under "OTHER PUBLICATIONS", in Column 2, Line 16,
delete "Institue" and insert -- Institute --, therefor.

On Page 2, Item (56), under "OTHER PUBLICATIONS", in Column 2, Line 19,
delete "2006" and insert -- 2006, --, therefor.

On Page 2, Item (56), under "OTHER PUBLICATIONS", in Column 2, Line 20,
delete "D-M." and insert -- D.M. --, therefor.

On Page 2, Item (56), under "OTHER PUBLICATIONS", in Column 2, Line 37,
delete "B" and insert -- B, --, therefor.

Signed and Sealed this
Twenty-eighth Day of May, 2013

Teresa Stanek Rea
*Acting Director of the United States Patent and Trademark Office*

On Page 2, Item (56), under "OTHER PUBLICATIONS", in Column 2, Line 41, delete "al," and insert -- al., --, therefor at each occurrence throughout the other publications.

On Page 2, Item (56), under "OTHER PUBLICATIONS", in Column 2, Line 42, delete "Electronics" and insert -- Electronics, --, therefor.

On Page 2, Item (56), under "OTHER PUBLICATIONS", in Column 2, Line 58, delete ""AlGaN/GaN/InGaN/GaN DH-HEMTs" and
insert -- "AlGaN/GaN/InGaN/GaN DH-HEMTs --, therefor.

On Page 2, Item (56), under "OTHER PUBLICATIONS", in Column 2, Line 63, delete "2006" and insert -- 2006, --, therefor.

On Page 2, Item (56), under "OTHER PUBLICATIONS", in Column 2, Line 71, delete "2005" and insert -- 2005, --, therefor.

On Page 3, Item (56), under "OTHER PUBLICATIONS", in Column 1, Line 8, delete "9783527408283" and insert -- 9783527408283, --, therefor.

On Page 3, Item (56), under "OTHER PUBLICATIONS", in Column 1, Line 20, delete "GaN/AlGaN" and insert -- GaN/AlGaN --, therefor.

On Page 3, Item (56), under "OTHER PUBLICATIONS", in Column 1, Line 21, delete "Phys." and insert -- Phys., --, therefor.

On Page 3, Item (56), under "OTHER PUBLICATIONS", in Column 1, Line 34, delete "InGaN/InGaAlN" and insert -- InGaN/InGaAlN --, therefor.

On Page 3, Item (56), under "OTHER PUBLICATIONS", in Column 1, Line 35, delete "stuctures" and insert -- structures --, therefor.

On Page 3, Item (56), under "OTHER PUBLICATIONS", in Column 1, Line 38, delete "GaN/AlGaN" and insert -- GaN/AlGaN --, therefor.

On Page 3, Item (56), under "OTHER PUBLICATIONS", in Column 1, Line 39, delete "Letters" and insert -- Letters, --, therefor.

On Page 3, Item (56), under "OTHER PUBLICATIONS", in Column 1, Line 49, delete "n-i-p." and insert -- n-i-p --, therefor.

On Page 3, Item (56), under "OTHER PUBLICATIONS", in Column 1, Line 57, delete "B." and insert -- B, --, therefor.

CERTIFICATE OF CORRECTION (continued)

U.S. Pat. No. 8,368,990 B2

On Page 3, Item (56), under "OTHER PUBLICATIONS", in Column 1, Line 63, delete "AiGan/" and insert -- AlGaN/ --, therefor.

On Page 3, Item (56), under "OTHER PUBLICATIONS", in Column 1, Line 67, delete "Photocoltaic" and insert -- Photovoltaic --, therefor.

On Page 3, Item (56), under "OTHER PUBLICATIONS", in Column 2, Line 13, delete "Cui" and insert -- CuI --, therefor.

On Page 3, Item (56), under "OTHER PUBLICATIONS", in Column 2, Line 28, delete "S.-H.," and insert -- S.H., --, therefor.

On Page 3, Item (56), under "OTHER PUBLICATIONS", in Column 2, Line 43, delete "Vaccum," and insert -- Vacuum, --, therefor.

In the Specifications:

In Column 1, Line 44, delete "1" and insert -- 1. --, therefor.

In Column 2, Line 12, delete "hereof" and insert -- hereof. --, therefor.

In Column 2, Line 45, delete "thereof" and insert -- thereof. --, therefor.

In Column 3, Line 15, delete "as" and insert -- as a --, therefor.

In Column 3, Line 15, delete "mode." and insert -- mode". --, therefor.

In Column 3, Line 23, in [Equation 1], delete "$H = \sum_i H_i^{JC} - \sum_{i,j} K_{ij} a_i^\dagger a_j - \sum_i \mu_i N_i$" and insert -- $H = \sum_i H_i^{JC} - \sum_{i,j} K_{ij} a_i^\dagger a_j - \sum_i \mu_i N_i$ --, therefor.

In Column 3, Line 44, delete "$|e\rangle\langle|$" and insert -- $|e\rangle\langle g|$ --, therefor.

In Column 4, Line 36, delete "$\langle n\pm|a_i|n\pm\rangle$" and insert -- $\langle n\pm|a_i|n\pm\rangle$ --, therefor.

In Column 4, Line 44, delete "A" and insert -- $\Delta$ --, therefor.

In Column 6, Line 44, delete "lager" and insert -- larger --, therefor.

CERTIFICATE OF CORRECTION (continued)
U.S. Pat. No. 8,368,990 B2

In Column 7, Line 13, delete "pearlite or mulite." and insert -- perlite or mulite. --, therefor.

In Column 8, Line 52, delete "71 0," and insert -- 710, --, therefor.

In Column 10, Line 18, delete "13 10," and insert -- 1310, --, therefor.

In Column 11, Line 24, delete "(e.g." and insert -- (e.g., --, therefor at each occurrence throughout the specification.

In Column 12, Line 15, delete "thereof" and insert -- thereof. --, therefor.

In the Claims:

In Column 15, Line 36, in Claim 23, delete "form" and insert -- from --, therefor.